US012464187B2

(12) United States Patent
Park et al.

(10) Patent No.: US 12,464,187 B2
(45) Date of Patent: Nov. 4, 2025

(54) DISPLAY DEVICE AND OPERATING METHOD THEREFOR

(71) Applicant: SAMSUNG ELECTRONICS CO., LTD., Suwon-si (KR)

(72) Inventors: Jiwon Park, Suwon-si (KR); Sehyun Kim, Suwon-si (KR); Kwansik Yang, Suwon-si (KR); Jongin Lee, Suwon-si (KR); Kilsoo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 24 days.

(21) Appl. No.: 18/117,018

(22) Filed: Mar. 3, 2023

(65) Prior Publication Data

US 2023/0209126 A1 Jun. 29, 2023

Related U.S. Application Data

(63) Continuation of application No. PCT/KR2021/012015, filed on Sep. 6, 2021.

(30) Foreign Application Priority Data

Sep. 4, 2020 (KR) .................. 10-2020-0113206

(51) Int. Cl.
*H04N 21/431* (2011.01)
*G06F 3/0482* (2013.01)
*H04N 7/15* (2006.01)

(52) U.S. Cl.
CPC ....... *H04N 21/4316* (2013.01); *G06F 3/0482* (2013.01); *H04N 7/152* (2013.01)

(58) Field of Classification Search
CPC ... H04N 21/4316; H04N 7/152; G06F 3/0482
See application file for complete search history.

(56) References Cited

U.S. PATENT DOCUMENTS 7,231,603 B2 6/2007 Matsumoto
8,245,258 B2 8/2012 Park et al.
(Continued)

FOREIGN PATENT DOCUMENTS

CN 1925556 3/2007
CN 104010158 8/2014
(Continued)

OTHER PUBLICATIONS

Extended Search Report dated Dec. 19, 2023 in EP Patent Application No. 21864744.4.
(Continued)

*Primary Examiner* — Yassin Alata
(74) *Attorney, Agent, or Firm* — Nixon & Vanderhye, P.C.

(57) ABSTRACT

An example operating method of a display device for displaying a multi-view screen including a plurality of partial screens includes respectively outputting a plurality of pieces of content, which are individually decoded, through the plurality of partial screens, identifying at least one of the plurality of pieces of content, based on a video call request, and outputting a video call screen through at least one partial screen corresponding to the identified at least one content from among the plurality of partial screens.

15 Claims, 26 Drawing Sheets

(56) References Cited

U.S. PATENT DOCUMENTS

| | | | |
|---|---|---|---|
| 8,760,489 B1* | 6/2014 | Osher | H04N 7/148 |
| | | | 348/14.07 |
| 8,773,493 B2 | 7/2014 | Lee | |
| 9,172,910 B2 | 10/2015 | Kim et al. | |
| 9,888,211 B1* | 2/2018 | Browne | H04L 65/1083 |
| 9,996,212 B2 | 6/2018 | Sun et al. | |
| 10,045,066 B2 | 8/2018 | Lee et al. | |
| 10,455,182 B2 | 10/2019 | Lee et al. | |
| 11,032,514 B2 | 6/2021 | Lee et al. | |
| 2011/0150217 A1* | 6/2011 | Kim | H04N 21/2347 |
| | | | 380/210 |
| 2011/0279640 A1 | 11/2011 | Choi | |
| 2012/0229591 A1* | 9/2012 | Lee | H04N 7/15 |
| | | | 348/14.08 |
| 2014/0068504 A1 | 3/2014 | Sun et al. | |
| 2014/0333671 A1 | 11/2014 | Phang et al. | |
| 2015/0288912 A1* | 10/2015 | Chun | H04N 21/4882 |
| | | | 348/552 |
| 2016/0191841 A1 | 6/2016 | Yoo | |
| 2016/0316174 A1* | 10/2016 | Whynot | H04N 7/152 |
| 2017/0171286 A1* | 6/2017 | Coste | H04L 65/403 |
| 2018/0316943 A1 | 11/2018 | Todd | |
| 2020/0186926 A1* | 6/2020 | Park | H04M 1/725 |

FOREIGN PATENT DOCUMENTS

| | | |
|---|---|---|
| CN | 104603733 | 5/2015 |
| CN | 105230005 | 1/2016 |
| CN | 105592342 | 5/2016 |
| CN | 105744323 | 7/2016 |
| EP | 1761048 A2 | 3/2007 |
| EP | 2703986 A2 | 3/2014 |
| JP | 3544152 | 7/2004 |
| JP | 4612779 | 1/2011 |
| KR | 10-0738540 | 7/2007 |
| KR | 10-1411313 | 6/2014 |
| KR | 10-1417002 | 7/2014 |
| KR | 10-1479087 | 1/2015 |
| KR | 10-1687616 | 12/2016 |
| KR | 10-1735381 | 5/2017 |
| KR | 10-2017-0091913 | 8/2017 |
| KR | 10-1894090 | 9/2018 |
| KR | 10-1955202 | 3/2019 |
| KR | 10-1961860 | 3/2019 |
| KR | 10-2145014 | 8/2020 |
| WO | 2017084356 | 5/2017 |

OTHER PUBLICATIONS

International Search Report for PCT/KR2021/012015, mailed Dec. 8, 2021, 4 pages.
Written Opinion of the ISA for PCT/KR2021/012015, mailed Dec. 8, 2021, 4 pages.
Office Action dated Jul. 23, 2024 in Chinese Patent Application No. 202180054872.4 and English-language translation.
Office Action dated Jan. 8, 2025 in Korean Patent Application No. 10-2020-0113206 and English-language translation.
Office Action dated Sep. 19, 2025 in Korean Patent Application No. 10-2020-0113206 and English-language translation.

* cited by examiner

FIG. 2

| NUMBER OF DIVIDED SCREENS | LAYOUT |
|---|---|
| 2 | |
| 3 | |
| 4 | 241  242  243 <br> 245  246 |

DISPLAY DEVICE AND OPERATING METHOD THEREFOR

CROSS-REFERENCE TO RELATED APPLICATIONS

This application is a continuation of International Application No. PCT/KR2021/012015 designating the United States, filed on Sep. 6, 2021, in the Korean Intellectual Property Receiving Office and claiming priority to Korean Patent Application No. 10-2020-0113206, filed on Sep. 4, 2020, in the Korean Intellectual Property Office, the disclosures of each of which are incorporated by reference herein in their entireties.

BACKGROUND

Field

The disclosure relates to a display device for providing a multi-view screen and an operating method of the display device and, for example, to a display device for processing a video call received while providing a multi-view, and an operating method of the display device.

Description of Related Art

With the development of wired/wireless communication networks and communication technology, the use of video call services between electronic devices has increased. In detail, video call services between electronic devices are widely used for non-face-to-face communication between different users located in remote locations.

For a video call service, one electronic device and another electronic device may be connected to each other through a wired/wireless communication network. Here, the electronic device includes a display for providing a video call screen, and may be any electronic device capable of communicating with other electronic devices in remote locations by accessing a wired/wireless communication network. Examples of the electronic device may include a portable computer such as a laptop computer, a netbook, or a tablet personal computer (PC), a portable terminal such as a smartphone or a personal digital assistant (PDA), a television (TV), and a digital TV.

When a video call is performed between a plurality of electronic devices, for example, a first electronic device and a second electronic device, the first electronic device obtains an image of a user (hereinafter, referred to as a 'first user') and transmits the obtained image to the second electronic device. Also, the second electronic device obtains an image of a user (hereinafter, referred to as a 'second user'), and transmits the obtained image to the first electronic device. Accordingly, each of the first electronic device and the second electronic device displays a video call screen including the images of the first user and the second user. Then, each of the first user and the second user may make a call while watching the image of the other party in a remote location.

SUMMARY

Embodiments of the disclosure provide a display device capable of providing a video call service while displaying a multi-view screen, and an operating method of the display device.

For example, embodiments of the disclosure provide a display device capable of providing a video call service to match a user's intention while displaying a multi-view screen, and an operating method of the display device.

According to an embodiment of the disclosure, an operating method of a display device for displaying a multi-view screen including a plurality of partial screens is provided. The operating method of the display device includes respectively outputting a plurality of pieces of content, which are individually decoded, through the plurality of partial screens, identifying at least one of the plurality of pieces of content, based on a video call request, and outputting a video call screen through at least one partial screen corresponding to the identified at least one content from among the plurality of partial screens.

The outputting of the video call screen may include stopping, by at least one decoder included in the display device, decoding of the identified at least one content, decoding, by the at least one decoder that has stopped decoding, an image signal corresponding to the video call screen, and outputting the video call screen through at least one partial screen on which the identified at least one content has been output based on the decoded image signal.

The identifying of the at least one content may include identifying the at least one content having a resolution that is same as a resolution of the video call screen, from among the plurality of pieces of content.

The identifying of the at least one content may include identifying the at least one content having an offset resolution, from among the plurality of pieces of content.

The identifying of the at least one content may include identifying the at least one content having a lowest resolution, from among the plurality of pieces of content.

The identifying of the at least one content may include identifying content output through a main screen, from among the plurality of pieces of content.

The identifying of the at least one content may further include determining whether there is the at least one content having the resolution corresponding to the video call screen, and, based on at least one content having the resolution corresponding to the video call screen not existing, performing a voice call switching process.

The identifying of the at least one content may further include determining whether there is the at least one content having the resolution corresponding to the video call screen, and, based on at least one content having the resolution corresponding to the video call screen not existing, ending a video call process.

The operating method may further include, in response to the video call request, displaying a user interface screen for selecting at least one of the plurality of partial screens, and receiving a user input that selects at least one of the plurality of partial screens through the user interface screen.

The identifying of the at least one content may include identifying the at least one content based on the receiving of the user input.

The identifying of the at least one content may include identifying first content from among the plurality of pieces of content output through the multi-view screen, in response to the video call request, and the outputting of the video call screen may include outputting the video call screen through a first partial screen corresponding to the first content.

The outputting of the video call screen may include stopping decoding of a first image signal corresponding to the first content, decoding, by a decoder that has stopped decoding the first image signal, an image signal, and outputting the video call screen through the first partial screen based on the decoded image signal.

The identifying of the at least one content may include identifying first content and second content from among the plurality of pieces of content output through the multi-view screen, based on the video call request. The outputting of the video call screen may include respectively displaying a counterpart image and a user image included in the video call screen on a first partial screen corresponding to the first content and a second partial screen corresponding to the second content.

According to an embodiment of the disclosure, a display device may include a display, a communication interface, a video processor including a plurality of decoders, and a processor configured to execute at least one instruction. The processor is configured to execute the at least one instruction to control the display to respectively output a plurality of pieces of content, which are individually decoded by the video processing unit, through a plurality of partial screens included in a multi-view screen, identify at least one content from among the plurality of pieces of content, based on a video call request, and control the display to output a video screen through at least one partial screen corresponding to the identified at least one content from among the plurality of partial screens.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 2 is a diagram illustrating a view for describing examples of a layout of a multi-view screen according to various embodiments;

DETAILED DESCRIPTION

Figure 1A:
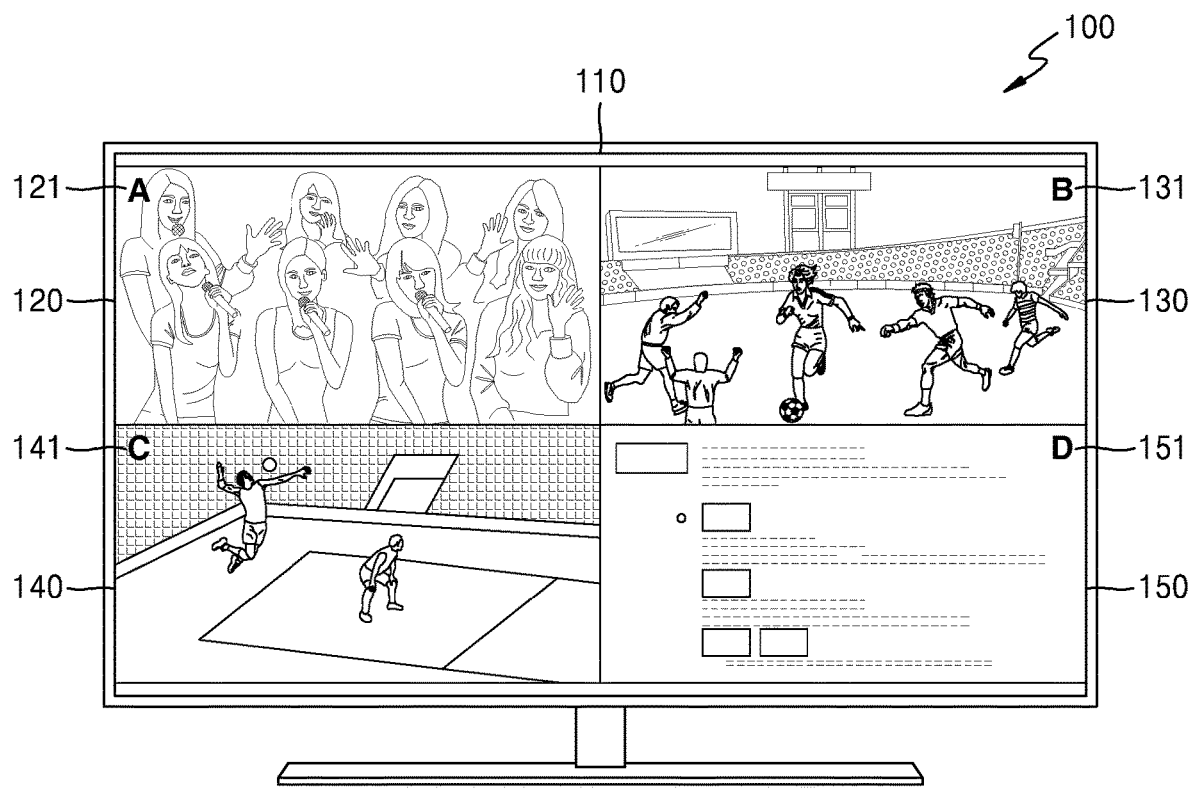
FIG. 1A is a diagram illustrating a view of a display device for outputting a multi-view screen, according to various embodiments.

The disclosure will now be described more fully with reference to the accompanying drawings for one of ordinary skill in the art to be able to perform the disclosure without any difficulty. However, the disclosure may be embodied in many different forms and is not limited to the example embodiments of the disclosure set forth herein. For clarity, portions irrelevant to the descriptions of the disclosure are omitted in the drawings, and like components are denoted by like reference numerals throughout the specification.

Throughout the specification, when a part is "connected" to another part, the part may not only be "directly connected" to the other part, but may also be "electrically connected" to the other part with another element in between. When a part "includes" an element, another element may be further included, rather than excluding the existence of the other element, unless otherwise described.

As used herein, phrases such as "in some embodiments" or "in an embodiment" does not necessarily indicate the same embodiment.

Various embodiments may be represented by functional block components and various process operations. All or some of such functional blocks may be implemented by various numbers of hardware and/or software components that perform particular functions. For example, functional blocks of the disclosure may be implemented using one or more processors or microprocessors, or circuit elements for intended functions. For example, the functional blocks of the disclosure may be implemented using various programming or scripting languages. The functional blocks may be implemented as an algorithm to be executed by one or more processors. In addition, the present disclosure may employ related-art techniques for electronic configuration, signal processing, and/or data processing, etc. Terms such as 'module', 'component', and the like may be used broadly and may not be limited to mechanical and physical elements.

Also, connection lines or connection members between components illustrated in the drawings are merely illustrative of functional connections and/or physical or circuit connections. In an actual device, connections between components may be represented by various functional connections, physical connections, or circuit connections that are replaceable or added.

In addition, the expression 'at least one of a, b, or c' indicates, for example, only a, only b, only c, both a and b, both a and c, both b and c, or all of a, b, and c.

An example embodiment of the disclosure relates to a display device and an operating method thereof. In detail, an example embodiment of the disclosure relates to an operating method in which a display device that outputs a multi-view screen processes a video call request when a video call is requested between a plurality of electronic devices, and a display device that performs the operating method.

In an example embodiment of the disclosure, an electronic device capable of providing a video call service includes a display for displaying a video call screen, and may be any electronic device capable of communicating with other electronic devices in remote locations by accessing a wired/wireless communication network. Also, an electronic device includes a display and may be any of various computing or computer devices capable of providing a video call service. Examples of the electronic device may include, but are not limited to, a wearable device, a smartphone, a personal digital assistant (PDA), a media player, a tablet personal computer (PC), a laptop computer, a media player, a television (TV), a digital TV, a smart TV, a digital signage, a digital signboard, or the like. Hereinafter, for convenience of explanation, an electronic device capable of providing a video call service according to an embodiment of the disclosure is referred to as a 'display device'.

Also, in the following description, a 'mobile device' and a 'display device' may each be an electronic device capable of performing a video call by displaying a video call screen on a display. That is, each of a 'mobile device' and a 'display device' may be a wearable device, a smartphone, a PDA, a media player, a tablet PC, a laptop computer, a media player, a TV, a digital TV, a smart signage, a digital signboard, or the like.

However, for convenience of explanation, a 'mobile device' and a 'display device' are distinguishably described. For example, an electronic device including a relatively large display or capable of providing a video call screen with a relatively wide viewing angle may be referred to as a 'display device', and an electronic device including a relatively small display or capable of providing a video call screen with a relatively narrow viewing angle may be referred to as a 'mobile device'.

Hereinafter, for convenience of explanation, a portable electronic device is referred to as a 'mobile device'. An electronic device capable of providing a large screen through a larger display than that of a mobile device and obtaining a video call screen with a wider viewing angle than that of a mobile device may be referred to as a 'display device'.

Also, a mobile device may be portable by a user. A display device may be portable, or may be provided at a fixed position. Alternatively, a display device may be portable and may be providable at a fixed position.

In the attached drawings, the following will be described assuming that a mobile device is a smartphone and a display device is a TV. Also, in the attached drawings, the same element is denoted by the same reference numeral. Also, throughout the detailed description, the same element is described with the same term.

A display device and an operating method thereof according to an embodiment of the disclosure will be described in detail with reference to the attached drawings.

FIG. 1A is a diagram illustrating a view of an example display device for outputting a multi-view screen, according to various embodiments.

A display device 100 according to an example embodiment of the disclosure is an electronic device for providing a multi-view screen. The term 'multi-view screen' may, for example, refer to a screen in which a screen output to a display included in the display device 100 is divided into partial screens and the plurality of partial screens respectively output a plurality of pieces of content.

Referring to FIG. 1A, the display device 100 may output a multi-view screen 110 including four partial screens 120, 130, 140, and 150. In detail, the display device 100 may display the multi-view screen 110 that is visually recognizable by a user.

For example, the multi-view screen 110 may output different pieces of content to the four partial screens 120, 130, 140, and 150. In the attached drawings and the detailed description, a plurality of pieces of content may, for example, be first content, second content, third content, and fourth connect which are different from each other.

In an example of FIG. 1A, the first content may be broadcast content corresponding to a music program received through a music broadcasting channel, and for convenience of explanation, the first content is indicated by an icon A 121. The second content may be broadcast content corresponding to a soccer game received through a sports channel, and for convenience of explanation, the second content is indicated by an icon B 131. The third content may be video streaming content corresponding to a volleyball game, rather than a real-time broadcast or live broadcast, received from a server of a content provider, and for convenience of explanation, the third content is indicated by an icon C 141. The fourth content may be Internet content received from a website server that provides a portal site, and, for convenience of explanation, the fourth content is indicated by an icon D 151. Accordingly, in example embodiments of the disclosure and the attached drawings, content indicated by the same icon (e.g., 'A') may refer to the same content (e.g., the first content).

An icon indicating certain content, for example, the icon A 121, may be represented by a combination of at least one of text, symbol, figure, identification mark, or color indicating the first content. The icon A may or may not be displayed on the actual partial screen 120.

The display device 100 according to an example embodiment of the disclosure may divide a screen corresponding to the entire display area of a display into a plurality of partial screens through screen division, and may output independent pieces of content to the plurality of partial screens.

The display device 100 may receive a first image signal corresponding to the first content, may decode the first image signal, and may output the same to the partial screen 120. The display device 100 may receive a second image signal corresponding to the second content, may decode the second image signal, and may output the same to the partial screen 130. The display device 100 may receive a third image signal corresponding to the third content, may decode the third image signal, and may output the same to the partial screen 140. The display device 100 may receive a fourth image signal corresponding to the fourth content, may decode the fourth image signal, and may output the same to the partial screen 150.

Figure 1B:
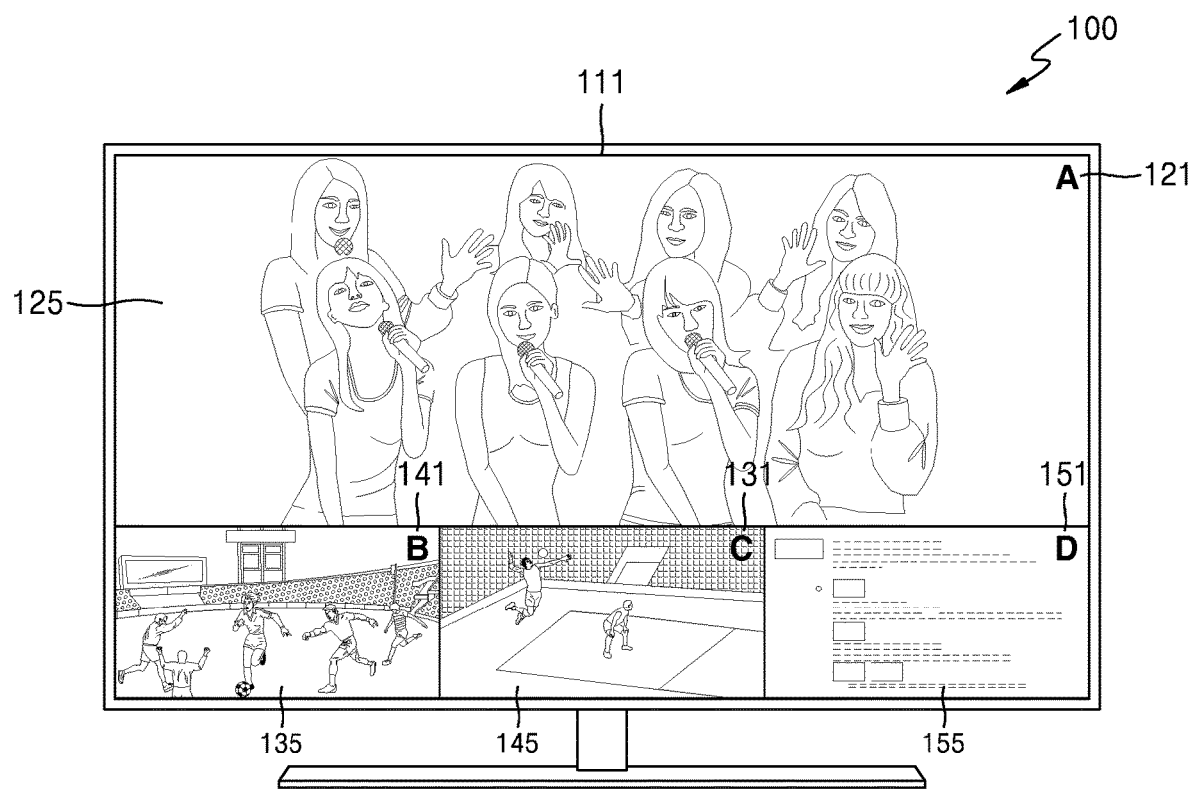
FIG. 1B is a diagram illustrating a view of a display device for outputting a multi-view screen, according to various embodiments.

FIG. 1B is a diagram illustrating a display device for outputting a multi-view screen, according to various embodiments. In FIG. 1B, the same elements as those in FIG. 1A are denoted by the same reference numerals. Accordingly, the same description as that made above will not be repeated.

Referring to FIG. 1B, unlike the multi-view screen 110 of FIG. 1A, a multi-view screen 111 output from the display device 100 may include a main screen 125 and one or more sub-screens 135, 145, and 155.

In FIG. 1B, first content output from the main screen 125, second content output from the sub-screen 135, third content output from the sub-screen 145, and fourth content output from the sub-screen 155 respectively correspond to the first content output from the partial screen 120, the second content output from the partial screen 130, the third content output from the partial screen 140, and the fourth content output from the partial screen 150 of FIG. 1A, and thus, a detailed description will not be repeated.

In order to display a multi-view screen, the display device 100 described with reference to FIGS. 1A and 1B may manage a plurality of decoders (not shown) to appropriately decode a plurality of image signals corresponding to a plurality of pieces of content included in the multi-view screen.

In detail, the display device 100 may provide a multi-view screen using a multi-view application. The term 'application' may refer to a program or a processor for performing a service, a function, or a specific operation. An application may include at least one instruction for performing a service, a function, or a specific operation. Also, the application may be stored in a processor (not shown) or a memory (not shown) included in the display device 100. In an embodiment of the disclosure, an application for performing a service, a function, or operations of providing a multi-view screen may, for example, be referred to as a 'multi-view application'.

A multi-view application may refer to an application in which, in order to provide a multi-view screen, a screen output from the display device 100 is divided according to a certain layout and a plurality of pieces of content are controlled to be output through a plurality of divided partial screens. The multi-view application may perform operations for providing a multi-view screen, and may control at least one of a hardware resource or a software resource of the display device 100 required to provide a multi-view screen. Examples of the hardware resource required to provide a multi-view screen may include a plurality of decoders for decoding a plurality of pieces of content output to the multi-view screen and a memory for storing an image to be output to the multi-view screen. Also, examples of the software resource required to provide a multi-view screen may include a software decoder for software decoding a plurality of pieces of content output to the multi-view screen.

In an embodiment of the disclosure, the multi-view application stored or included in the display device 100 may generally control generation and output of a multi-view screen.

As described above, the display device may provide a multi-view screen by controlling a screen to be divided into a plurality of partial screens and managing decoding operations of the plurality of decoders included in the display device 100.

FIG. 2 is a diagram illustrating a view for describing examples of a layout that may be output to a multi-view screen, according to various embodiments. FIG. 2 is a diagram illustrating examples of a layout of the multi-view screen 110 displayed by the display device 100 of FIGS. 1A and 1B.

Referring to FIG. 2, the multi-view screen 110 or 111 of FIG. 1A or 1B may have any of various layouts. Also, there may be various types of layouts in addition to the layouts illustrated in FIG. 2.

For example, a layout of the multi-view screen 110 may be determined by considering, for example, the number of partial screens, an aspect ratio supported by a display, an aspect ratio of content output through each of the partial screens, an aspect ratio of a partial screen, and/or an aspect ratio of a window (execution window) of an Internet portal transmitted through an Internet server. Also, a layout of the multi-view screen 110 may be determined according to a user's settings or settings of the display device 100.

Referring to table 200 of FIG. 2, when the number of divided screens is 4, that is, the multi-view screen 110 includes four partial screens, the multi-view screen 110 may include layouts 241, 242, 243, 245, and 246. For example, the layout 241 corresponds to a case in which the multi-view screen is equally divided into four partial screens. Also, the layouts 242, 243, 245, and 246 correspond to cases in which the multi-view screen is unequally divided into four partial screens. In this case, one main screen and three sub-screens may be included in each of the layouts 242, 243, 245, and 246.

The following will be described assuming that a multi-view screen includes four partial screens, and includes the layout 241 or the layout 245.

Figure 3:
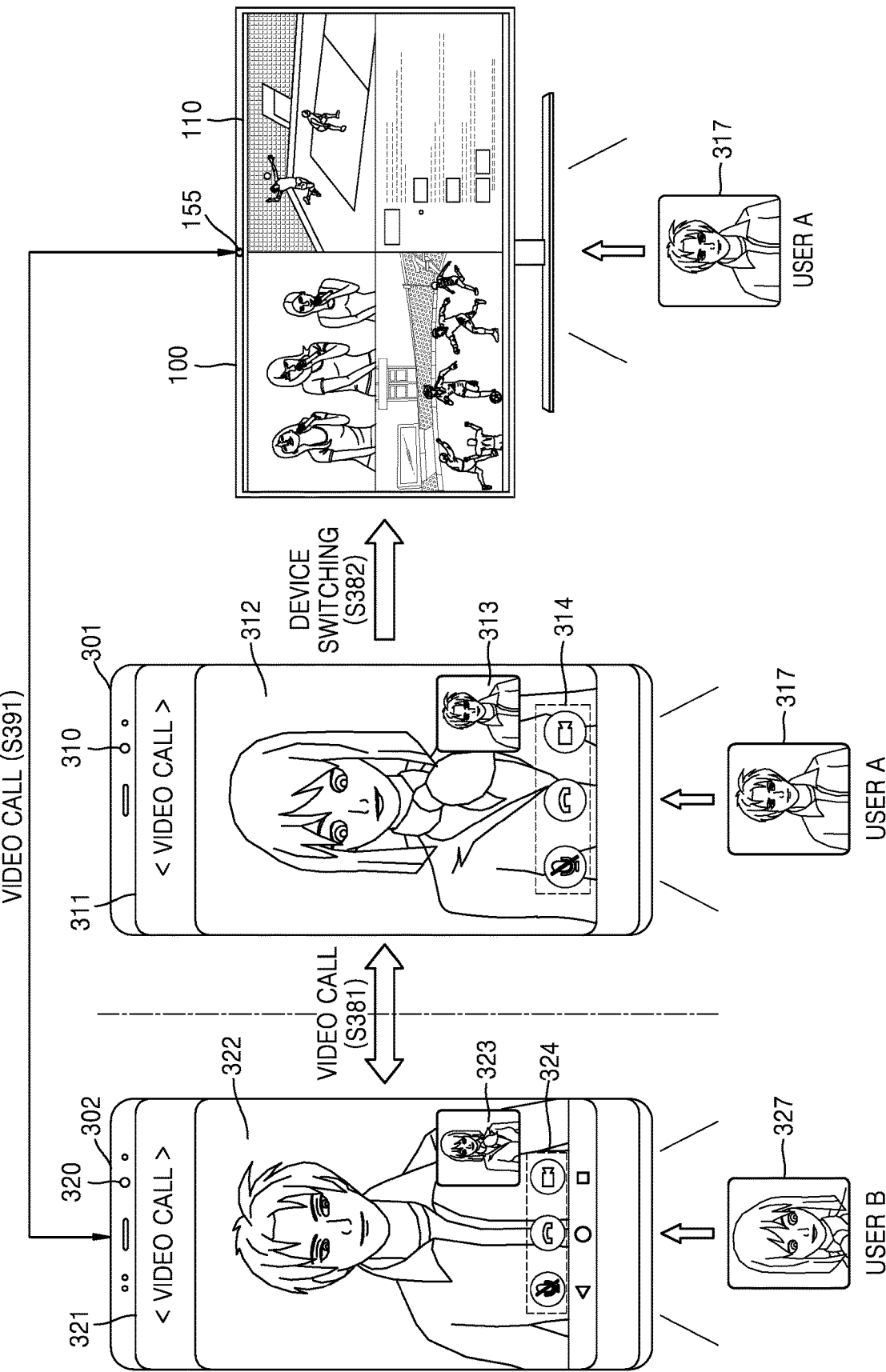
FIG. 3 is a diagram illustrating a view for describing an operation of receiving a video call request while a multi-view screen is output according to various embodiments.

FIG. 3 is a diagram illustrating a view for describing an operation of receiving a video call request while a multi-view screen is output, according to various embodiments. In FIG. 3, the same elements as those in FIG. 1A are denoted by the same reference numerals. Also, in the attached drawings, the same reference numerals denote the same elements. Accordingly, a description thereof will not be repeated.

Referring to FIG. 3, the display device 100 that displays the multi-view screen 110 may provide a video call service.

In an embodiment of the disclosure, a video call may, for example, refer to a call in which each of a plurality of users located in remote locations makes a call while watching the other party's face on a screen through a plurality of electronic devices. Also, a 'video call' described in various embodiments may, for example, be applied to any field in which users located in remote locations perform communication while receiving images of each other, such as video conferencing, non-face-to-face communication or non-face-to-face education, and may refer to any case in which a plurality of users located in remote locations perform communication while watching images of counterparts. An image included in a video call screen does not need to be the face of a user using a video call, and may, for example, be an image indicating an environment where the user using the video call is located or an image provided by the user.

In general, a video call may be performed between two different electronic devices. Alternatively, three or more users located in remote locations may perform a video call through three or more electronic devices.

The following will be described assuming that one user (hereinafter, referred to as a 'user') and another user (hereinafter, referred to as 'a counterpart') perform a video call through two electronic devices in remote locations. Here, a user does not refer to one person, but may be plural, and a counterpart may also be plural.

Referring to FIG. 3, a video call may be performed between the display device 100 and a counterpart device 302 which are electronic devices located in remote locations (S391). Also, a video call may be performed by transmitting and receiving data required for a video call by using a communication network such as third generation (3G), fourth generation (4G), or fifth generation (5G). Alternatively, a video call may be performed through a call service of a telecommunication company. Also, a video call may be performed through a certain application (e.g., a video call application, a non-face-to-face communication application, a video education application, or a video conferencing application) provided through a server of a service provider.

Hereinafter including FIG. 3, an electronic device of a user is the display device 100, and an electronic device of the other party (counterpart) who wants to make a video call with the user is referred to as the counterpart device 302. Also, the user of the display device 100 is identified as a 'user A', and the counterpart who wants to make a video call with the user A is identified as a 'user B'. That is, in an embodiment of the disclosure, a counterpart of a video call may, for example, refer to a 'user B'. Also, FIG. 3 will be described assuming that the counterpart device 302 is a smartphone. The display device 100 and a mobile device 301 may be electronic devices owned by a user 317, and the counterpart device 302 may be an electronic device owned by a counterpart 327.

Referring to FIG. 3, the display device 100 may perform a video call with the counterpart device 302 that is an electronic device of the counterpart located in a remote location (S391). The display device 100 may perform a video call by performing its own call function or an application for non-face-to-face communication.

Alternatively, a video call executed on the mobile device 301 may be performed in the display device 100 through device switching. In detail, a video call may be performed between the mobile device 301 and the counterpart device 302 (S381). Subsequently, a device for executing a video call execution may be switched or changed from the mobile device 301 to the display device 100 (S382).

As described above, the display device 100 may perform a direct video call with the counterpart device 302, using its own video call service function. Alternatively, the display device 100 may perform a video call through device switching, with respect to a video call performed or initiated by the mobile device 301. The following will be described assuming that, when the display device 100 provides a video call service, the display device 100 directly performs a video call with the counterpart device 302 (S391).

In an embodiment of the disclosure, the display device 100 may receive a video call request, while displaying the multi-view screen 110. Here, the video call request may be received from the counterpart device 302. Alternatively, the video call request may be received based on a request of the user 317 of the display device 100. For example, when the user 317 of the display device 100 wants to make a video call, the user may transmit a user input that selects an application, a program, or a menu for providing a video call service of the display device 100 to the display device 100. Then, the display device 100 may recognize that the video call request is received based on the user input.

When the video call is initiated, the electronic devices (e.g., 301 and 302) performing the video call may each display a video screen. For example, a display of the mobile device 301 that is an electronic device of the user 317 may display a video call screen 311 including an image 312 of the counterpart 327 as a main screen and an image (e.g., 313) of the user 317 as a sub-screen. Also, the video call screen 311 may further include menus 314 for controlling the video call. Also, a display of the counterpart device 302 that is an electronic device of the counterpart 327 may display a video call screen 321 including an image 323 of the counterpart 327 as a sub-screen and an image (e.g., 322) of the user 317 as a main screen. Also, the video call screen 321 may further include menus 324 for controlling the video call.

Here, an image of the counterpart 327 may be obtained by a camera 320 included in the counterpart device 302. In detail, when the video call request is received, the counterpart device 302 may activate the camera 320 to obtain an image of the counterpart 327. An image of the user 317 may be obtained by the mobile device 301 that is an electronic device of the user 317 or by the display device 100. When the display device 100 directly performs a video call with the counterpart device 302, a camera 155 of the display device 100 may obtain an image of the user 317. Alternatively, when the display device 100 performs a video call through device switching S382, an image of the user may be obtained by a camera 310 included in the mobile device 301. In this case, the mobile device 301 may obtain an image of the user and may transmit the image of the user to the counterpart device 302 and the display device 100. Also, alternatively, when the display device 100 performs a video call through device switching S382, the display device 100 may obtain an image of the user 317 through the camera 155 after the device switching is completed.

As described above, a video call screen (e.g., 311 or 321) may include images of a user and a counterpart using a video call service, and an image signal corresponding to a video call screen may be an image signal having a certain resolution.

Also, an image signal included in a video call screen may include a user image signal that is an image signal corresponding to an image of a user and a counterpart image signal that is an image signal corresponding to an image of a counterpart.

Because an electronic device for providing a video call service, for example, the display device 100, should visually output a video call screen, the electronic device includes a display. There may be a case in which the electronic is displaying certain content before receiving a video call request. In this case, it is necessary to provide a method of processing the video call request.

However, when an electronic device of a user receives a video call request while displaying a plurality of pieces of content, it is not defined, for example, (i) whether the electronic device should stop displaying the plurality of pieces of content, (ii) which of the plurality of pieces of content should be stopped, or (iii) which of a plurality of partial screens on which the plurality of pieces of content have been displayed should be used to output a video call screen.

Accordingly, an embodiment of the disclosure enables an electronic device that simultaneously displays a plurality of pieces of content to provide a video call service while increasing user satisfaction.

Operations performed by a display device according to an embodiment of the disclosure when a video call request is received while the multi-view screen 110 is displayed will be described in detail with reference to FIGS. 4 to 25.

Figure 4:
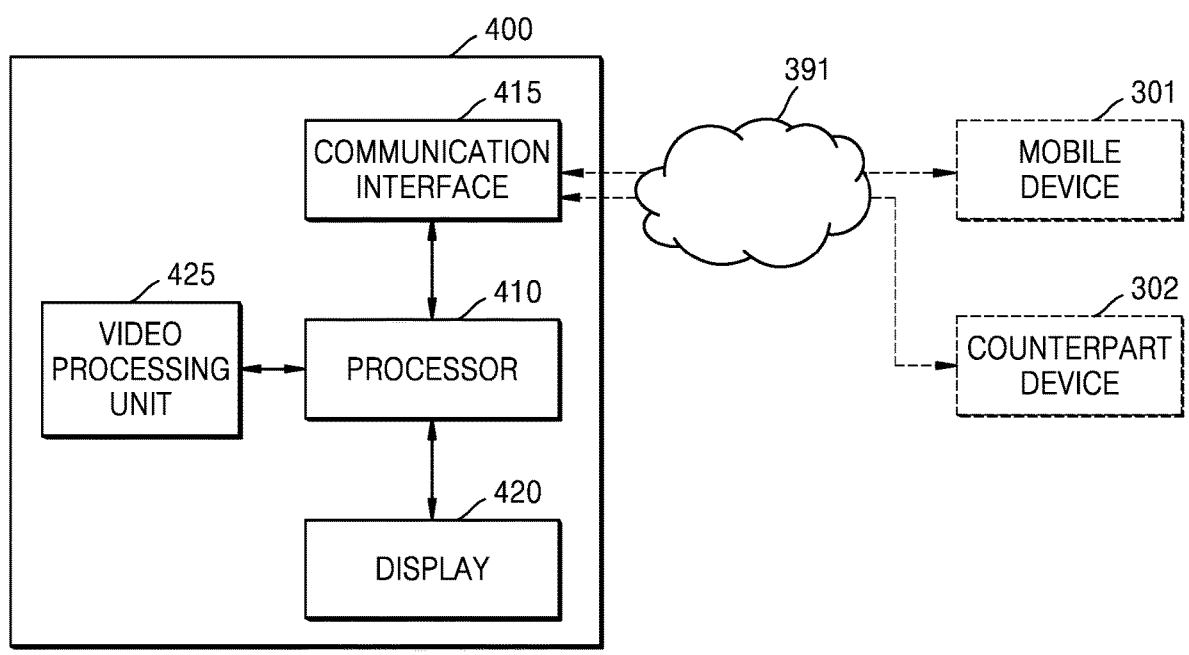
FIG. 4 is a diagram illustrating a display device, according to various embodiments.

FIG. 4 is a diagram illustrating a display device, according to various embodiments.

Referring to FIG. 4, a display device 400 may correspond to the display device 100 of FIGS. 1A, 1B, 2, and 3. Accordingly, when operations of the display device 400 are described, the same description as that made with reference to FIGS. 1A, 1B, 2, and 3 will not be repeated.

Referring to FIG. 4, the display device 400 includes a processor 410, a display 420, a video processing unit 425, and a communication interface 415. In FIG. 4, although the processor 410, the display 420, the video processing unit 425, and the communication interface 415 are connected to each other, at least two of the processor 410, the display 420, the video processing unit 425, and the communication interface 415 may be directly or indirectly connected to each other.

The processor 410 (e.g., including processing circuitry) controls an intended operation to be performed, by executing at least one instruction. The at least one instruction may be stored in a memory (not shown) included in the processor 410 or in a memory (not shown) included in the display device 400 separately from the processor 410.

In detail, the processor 410 may control at least one element included in the display device 400 to perform an intended operation, by executing the at least one instruction. Accordingly, even when the processor 410 performs certain operations, it may mean, for example, that the processor 410 controls at least one element included in the display device 400 to perform the certain operations. Also, although the processor 410 includes one processor, the processor 410 may include a plurality of processors.

The display 420 outputs an image to a screen. In detail, the display 420 may output an image corresponding to video data, through a display panel (not shown) included therein, so that a user visually recognizes the video data. The video data may correspond to a decoded image signal.

In an embodiment of the disclosure, the display 420 may output a multi-view screen. Also, the display 420 may output a video call screen through at least one partial screen included in the multi-view screen.

The communication interface 415 (e.g., including communication interface circuitry) may perform communication with at least one external electronic device, server, and/or broadcasting station. The at least one external electronic device may be the mobile device 301, the counterpart device 302, and/or an external storage medium connectable through a connecting terminal.

In detail, the communication interface 415 may receive data from various data sources. For example, the communication interface 415 may receive a plurality of pieces of content. The communication interface 415 may receive a plurality of image signals corresponding to a plurality of pieces of content from a broadcasting station, an Internet server, a content provider server, etc. For example, each of the plurality of image signals may be a broadcast stream signal, a transport stream (TS), or a video streaming signal.

A configuration of the communication interface 415 will be described in greater detail with reference to FIG. 5.

The video processing unit 425 (e.g., including video processing circuitry) may process an image of video data. In detail, the video processing unit 425 may process video data, for example, an image signal, received by the display device 400. The video processing unit 425 may perform various image processing such as decoding, scaling, noise filtering, frame rate conversion, and resolution conversion on the video data.

In an embodiment of the disclosure, the video processing unit 425 may include a plurality of decoders (not shown), and may individually decode the plurality of pieces of content through the plurality of decoders (not shown). The plurality of decoders (not shown) may respectively decode a plurality of image signals corresponding to the plurality of pieces of content. A group of the plurality of decoders may be referred to as 'multi-decoders'.

The display device 400 may include two or more decoders, and the two or more decoders may individually decode the plurality of image signals corresponding to the plurality of pieces of content. Also, the plurality of decoders (not shown) included in the display device 400 may correspond to different resolutions. For example, the display device 400 may include a 4K decoder (not shown) and a 2K decoder (not shown). The 4K decoder may decode an image signal corresponding to an image having a resolution of 4K or less. Also, the 2K decoder may decode an image signal corresponding to an image having a resolution of 2K or less. Also, each of the plurality of decoders may simultaneously decode at least one image signal. For example, the 2K decoder may simultaneously decode two image signals each having a resolution of 2K through time division.

In order to display a multi-view screen, the processor 410 may manage the plurality of decoders to appropriately decode the plurality of image signals corresponding to the plurality of pieces of content included in the multi-view screen.

In an embodiment of the disclosure, the processor 410 controls the display 420 to output a plurality of pieces of content, which are individually decoded through the video processing unit 425, through a plurality of partial screens included in a multi-view screen (not shown in FIG. 4) (e.g., the multi-view screen 110 of FIG. 1A), by executing at least one instruction. The processor 410 identifies at least one content from among the plurality of pieces of content, based on a video call request. In detail, the processor 410 may identify at least one content having a resolution corresponding to a video call screen from among the plurality of pieces of content, in response to the video call request.

Subsequently, the processor 410 controls the display 420 to output the video call screen through at least one partial screen corresponding to the identified at least one content from among a plurality of partial screens included in the multi-view screen.

For example, the processor 410 may include a multi-view application described above. The multi-view application of the processor 410 may identify at least one content from among the plurality of pieces of content output to the multi-view screen, based on the video call request. The multi-view application may control the display 420 to output the video call screen through a partial screen corresponding to the identified content.

The expression 'individually decoded' may, for example refer to each of the plurality of image signals corresponding to the plurality of pieces of content being independently decoded. That is, a plurality of images corresponding to the plurality of pieces of content are not integrated and decoded as one image.

Also, the 'video call request' may refer, for example, to a control signal for requesting to start or execute a video call service. The video call request may be generated based on a user input of the display device 400. Alternatively, the video call request may be received from the counterpart device 302 that wants to perform a video call with the display device 400 or the mobile device 301 that requests device switching.

Also, the 'resolution corresponding to the video call screen' may refer, for example, to a resolution of an image signal corresponding to the video call screen. Alternatively, the 'resolution corresponding to the video call screen' may refer, for example, to a resolution corresponding to each of a plurality of images (e.g., an image of a user and an image of a counterpart) included in the video call screen.

For example, when an image signal corresponding to the entire video call screen is received, the image signal may be an image signal having a resolution of 1K, 2K, 4K, or 8K.

In an embodiment, when a user image signal corresponding to the image of the user and a counterpart image signal corresponding to the image of the counterpart included in the video call screen are received, each of the user image signal and the counterpart image signal may be an image signal having a resolution of 1K, 2K, 4K, or 8K. The user image signal and the counterpart image signal may have the same resolution or may have different resolutions.

The processor 410 may include a random-access memory (RAM) (not shown) which stores signals or data input from the outside of the display device 400 or is used as a storage for various operations performed by the display device 400, a read-only memory (ROM) (not shown) which stores a control program and/or multiple instructions for controlling the display device 400, and at least one processor (not shown). The processor (not shown) may include a graphics processing unit (not shown) for graphics processing on a video. The processor (not shown) may be implemented, for example, as a system on a chip (SoC) in which a core (not shown) and the GPU (not shown) are integrated. Also, the processor 410 may include a single core or multi-core. For example, the processor 410 may include a dual-core, triple-core, quad-core, hexa-core, octa-core, deca-core, dodeca-core, hexadecimal-core, etc.

Also, the processor 410 may initiate a video call service with the counterpart device 302 in response to a video call request. As described above, a video call may be performed through a video call function of the display device 400 or an application for providing a video call service. For example, an application for providing a video call service may, for example, be referred to as a video call application.

In detail, the processor 410 may store a video call application. Alternatively, a video call application may correspond to at least one processor included in the processor 410. Also, a video call application may be distributed online (e.g., downloaded or uploaded) through an application store (e.g., Play Store™). When distributed online, the video call application may be distributed through a server of a manufacturer, a server of the application store, or a relay server.

For example, a video call application may be installed in at least two of the mobile device 201, the counterpart device 202, and the display device 400, and a video call may be performed between the two devices using the video call application.

Figure 5:
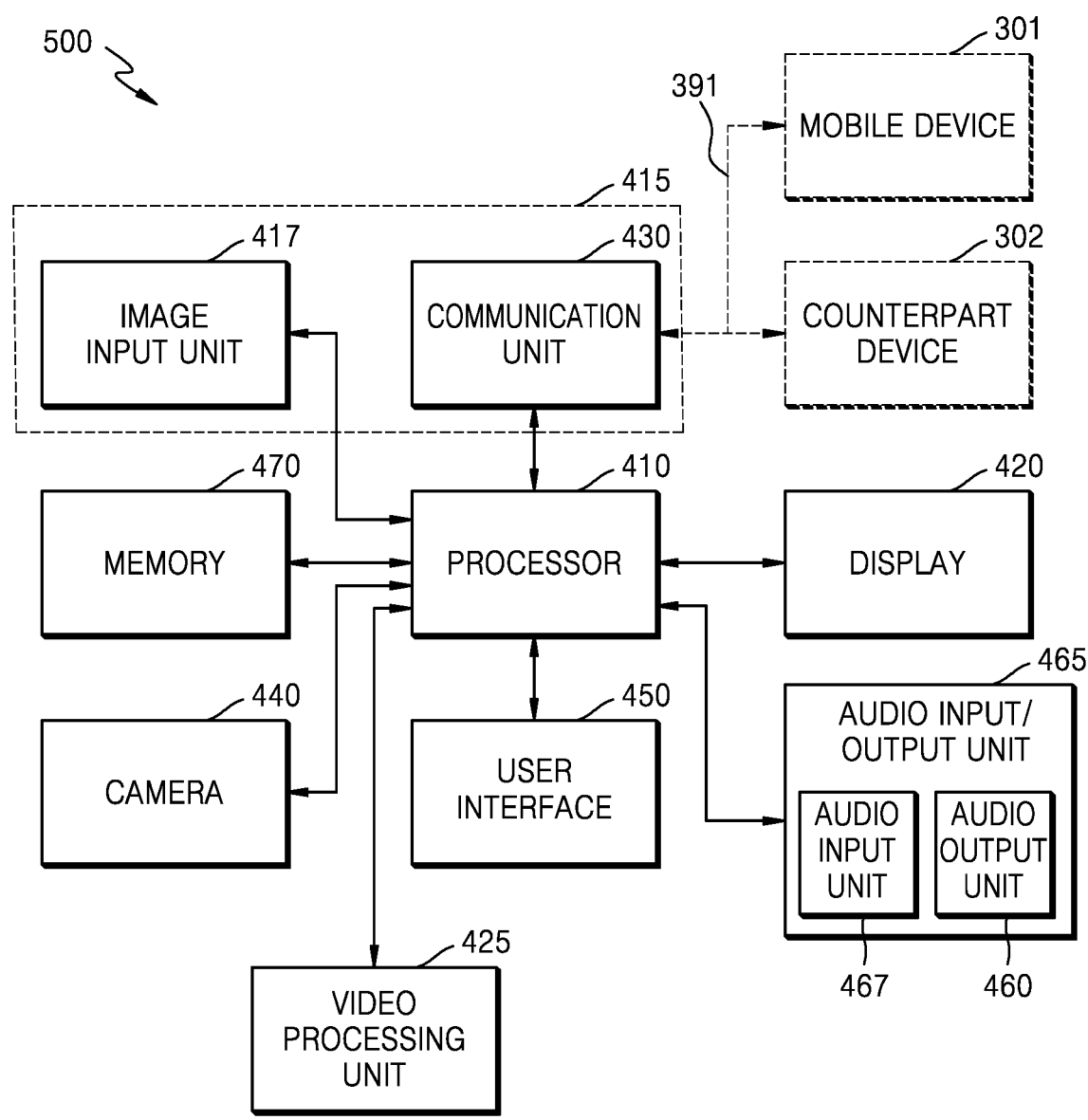
FIG. 5 is a diagram illustrating a display device, according to various embodiments.

FIG. 5 is a diagram illustrating a display device, according to various embodiments. The display device 500 of FIG. 5 may correspond to the display device 400 of FIG. 4. Accordingly, when the display device 500 is described, the same description as that made with reference to FIG. 4 will not be repeated.

Referring to FIG. 5, the display device 500 may further include at least one of a camera 440, a memory 470, a user interface 450, and an audio input/output unit 465, compared to the display device 400.

Referring to FIG. 5, the communication interface 415 (e.g., including communication interface circuitry) may include an image input unit 417 and a communication unit 430. In the communication interface 415, a configuration for receiving a data source used to display an image may be referred to, for example, as the image input unit 417, and a configuration communicable with an external electronic device located in a remote location through a wireless communication network may be referred to, for example, as the communication unit 430.

The image input unit 417 (e.g., including image input circuitry) may receive data from various data sources. For example, the image input unit 417 may include a tuner (not shown) for receiving a live stream coming through a broadcast, a universal serial bus (USB) connection port (not shown) for playing a video, a high-definition multimedia interface (HDMI) connection port (not shown) for receiving an external input, and a component (not shown).

Also, the image input unit 417 may receive input data with various formats. Formats of data received through the image input unit 417 may have RGB and YUV formats. The image input unit 417 may receive a plurality of input data (in detail, image resources) having various formats.

The communication unit 430 (e.g., including communication circuitry) performs communication with an external electronic device (not shown) through at least one wired or wireless communication network. In an embodiment of the disclosure, the communication unit 430 may communicate with at least one of the mobile device 301 and the counterpart device 302. Also, the communication unit 430 may communicate with a server (not shown in FIG. 5) (e.g., a server 700 of FIG. 7) to transmit and receive certain data to and from at least one of the mobile device 301 and the counterpart device 302. The communication unit 430 may communicate with a content providing server and an Internet server.

The communication unit 430 may communicate with an external device (e.g., at least one of the mobile device 301, the counterpart device 302, and a server (not shown)) through a communication network 391. The communication unit 430 may include at least one communication module and communication circuit, and may transmit and receive data to and from an external device through the communication module and/or communication circuit.

In detail, the communication unit 430 may include at least one short-range communication module (not shown) that performs communication according to a communication standard such as Bluetooth, Wi-Fi, Bluetooth low energy (BLE), near-field communication (NFC)/radio frequency identification (RFID), Wi-Fi Direct, ultra-wideband (UWB), or Zigbee.

Also, the communication unit 430 may further include a long-range communication module (not shown) that performs communication with a server (not shown) for supporting long-range communication according to a long-range communication standard. The communication unit 430 may include a long-range communication module (not shown) that performs communication through a network for Internet communication. Also, the communication unit 430 may include a communication network conforming to a communication standard such as 3G, 4G, and/or 5G.

The user interface 450 (e.g., including user interface circuitry) may receive a user input for controlling the display device 500. For example, the user interface 450 may receive a video call request from a user.

The user interface 450 may include a user input device including, but not limited to, a touch panel that detects a touch of the user, a button that receives a push operation of the user, a wheel that receives a rotation operation of the user, a keyboard, and/or a dome switch.

Also, the user interface 450 may include a voice recognition device (not shown) for voice recognition. For example, the voice recognition device (not shown) may be a microphone, and the voice recognition device may receive a voice command or a voice request of the user. Accordingly, the processor 410 may control an operation corresponding to the voice command or the voice request to be performed.

The user interface 450 may include a motion detection sensor (not shown). For example, the motion detection sensor (not shown) may detect a motion of the display device 500, and may receive the detected motion as a user input. Also, the voice recognition device (not shown) and the motion detection sensor (not shown) may not be included in the user interface 450, but may be included in the display device 500 as a module independent from the user interface 450.

The user interface 450 may receive a user input through a remote controller or the like. In this case, the user interface 450 may include a communication module for receiving a signal corresponding to a user input from the remote controller (not shown). For example, when the remote controller (not shown) transmits an infrared (IR) signal corresponding to a user input, the user interface 450 may include a communication module (not shown) for receiving an IR signal.

When the display device 500 and the external mobile device 301 are wirelessly connected to each other, the user interface 450 may receive a user input received through a touch panel (not shown) of the mobile device 301.

Alternatively, a user input received through the touch panel (not shown) of the mobile device 301 may be received through the communication unit 430 of the display device 500 and may be transmitted to the processor 410. For example, when the display device 500 and the external mobile device 301 are wirelessly connected to each other through a Wi-Fi network or a Bluetooth network, a user input received through the touch panel (not shown) of the mobile device 301 may be received through a Wi-Fi communication module (not shown) or a Bluetooth communication module (not shown) of the communication unit 430.

The camera 440 may include an image sensor (not shown), and may obtain an image frame such as a still image or a moving image through the image sensor in a video call mode or an imaging mode. In an embodiment of the disclosure, the camera 440 may be activated when a video call request is received. Accordingly, the activated camera 440 may obtain an image of a user requesting a video call.

The camera 440 may obtain an image frame at a certain time interval according to set frames per second (FPS). For example, the camera 440 may obtain 30 image frames per second. Accordingly, a first image obtained by the camera 440 may refer to a set of images or each of images continuously obtained and updated.

Also, the display device 500 may include one camera. Also, the display device 500 may include a plurality of cameras located at different positions. When the display device 500 includes a plurality of cameras, the display device 500 may allow the user to select any one of the plurality of cameras for a video call, based on a user input or settings of the display device 500.

A camera for obtaining an image of the user may be provided separately from the display device 500, rather than being included in the display device 500. For example, the camera may be an external camera (not shown) located on a side surface of or adjacent to the display device 500, in order to obtain an image of a front surface of the display device 500. In this case, the external camera (not shown) and the display device 500 may be connected to each other through a wired/wireless signal line, and the external camera (not shown) may obtain an image of the user on a video call under the control by the display device 500.

For convenience of explanation, the following will be described assuming that the camera for obtaining an image of the user for a video call is included in the display device 500.

The memory 470 may store at least one instruction. The memory 470 may store at least one instruction executed by the processor 410. Also, the memory 470 may store at least one program executed by the processor 410. The memory 470 may store an application for providing a certain service. For example, the memory 470 may store a video call application.

The memory 470 may include at least one type of storage medium from among a flash memory-type storage medium, a hard disk-type storage medium, a multimedia card micro-type storage medium, a card-type memory (e.g., an SD or XD memory), a RAM, a static RAM (SRAM), a ROM, an electrically erasable programmable ROM (EEPROM), a programmable ROM (PROM), a magnetic memory, a magnetic disk, and an optical disk.

The audio input/output unit 465 (e.g., including audio input/output circuitry) may output audio that may be audibly recognized by the user, or may detect and/or receive audio. In detail, the audio input/output unit 465 may include an audio output unit 460 and an audio input unit 467.

The audio output unit 460 (e.g., including audio output circuitry) outputs audio under the control by the processor 410.

In detail, the audio output unit 460 may output audio (e.g., voice or sound) input through the communication unit 430.

In an embodiment of the disclosure, the processor 410 may control audio received from the counterpart device 302 of a video call to be output through the audio output unit 460 during a video call mode.

Also, the audio output unit 460 may output audio stored in the memory 470 under the control by the processor 410. The audio output unit 460 may include at least one of a speaker (not shown), a headphone output port (not shown), or a Sony/Philips digital interface (S/PDIF) output port (not shown). The audio output unit 460 may include a combination of a speaker (not shown), a headphone output port (not shown), and a Sony/Philips digital interface (S/PDIF) output port (not shown).

The audio input unit 467 (e.g., including audio input circuitry) receives an audio. In detail, the audio input unit 467 may include a microphone (not shown) that receives audio, which is an external sound signal, and processes the audio into electrical voice data. For example, the microphone (not shown) included in the audio input unit 467 may receive a sound signal from an external device or an utterer, for example, the user engaging in a video call. Also, the microphone (not shown) included in the audio input unit 467 may use various noise removal algorithms for removing noise occurring in a process of receiving an external sound signal.

In an embodiment of the disclosure, the audio input unit 467 may receive a sound signal including the user's voice during a video call mode, and may process the user's voice to be recognized by removing noise in the received sound signal, under the control by the processor 410.

Figure 6:
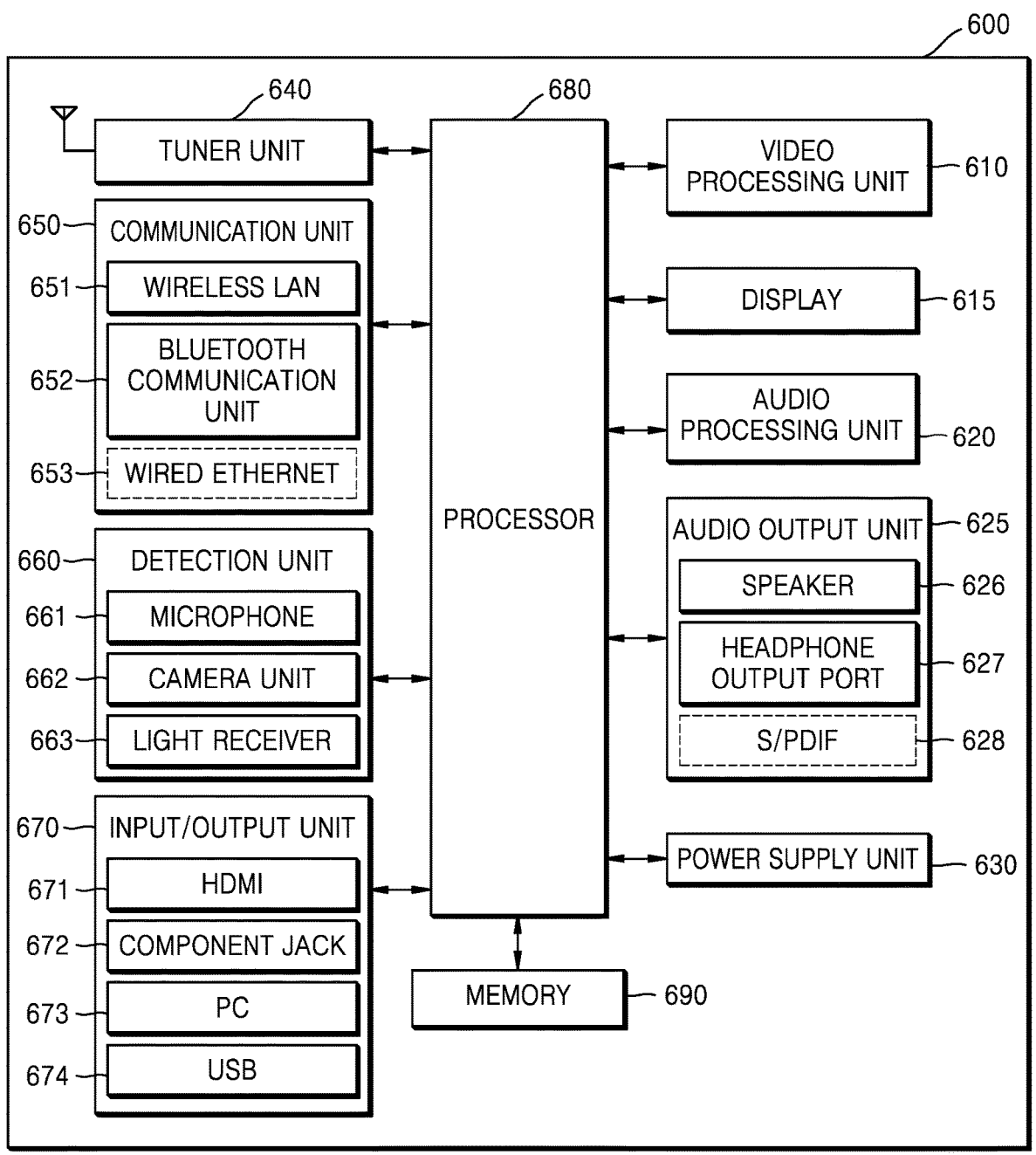
FIG. 6 is a diagram illustrating a display device, according to various embodiments.

FIG. 6 is a diagram illustrating a display device, according to various embodiments. A display device 600 of FIG. 6 may correspond to the display device 100, 400, or 500 according to an embodiment of the disclosure described with reference to FIGS. 1A, 1B, 2, 3, 4, and 5. Accordingly, when the display device 600 is described, the same description as that made with reference to FIGS. 1A, 1B, 2, 3, 4, and 5 will not be repeated.

In detail, a processor 680, a display 615, a video processing unit 610, a camera unit 662, a memory 690, an audio output unit 625, and a microphone 661 included in the display device 600 of FIG. 6 may correspond to the processor 410, the display 420, the video processing unit 425, the camera 440, the memory 470, the audio output unit 460, and the audio input unit 467 included in the display device 500 of FIG. 5.

Figure 9:
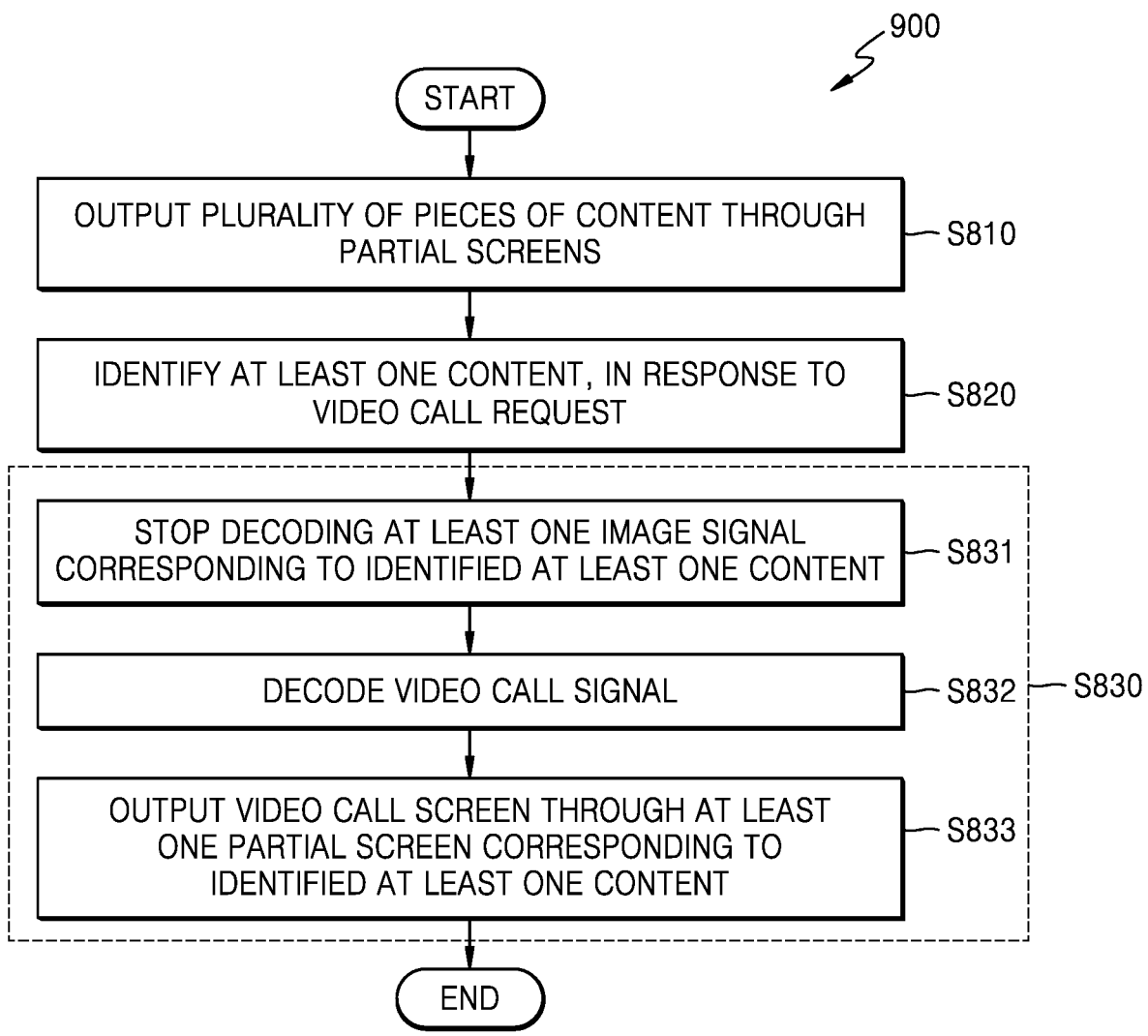
FIG. 9 is a flowchart illustrating an example operating method of a display device, according to various embodiments.

Also, a tuner unit 640 and an input/output unit 670 of FIG. 9 may correspond to the image input unit 417 of FIG. 5.

The video processing unit 610 (e.g., including video processing circuitry) processes data, for example, video data, received by the display device 600. The video processing unit 610 may perform various image processing such as decoding, scaling, noise filtering, frame rate conversion, and resolution conversion on the video data. Also, the video processing unit 610 may be included in the processor 680.

The processor 680 (e.g., including processing circuitry) may receive a recording request for the video data processed by the video processing unit 610, and may control the video data to be encrypted and recorded on a memory device (not shown), for example, a RAM (not shown), included in the memory 690 or the processor 680.

The display 615 displays a certain screen. In detail, the display 615 may display, on a screen, a video included in a broadcast signal received through the tuner unit 640 under the control by the processor 680. Also, the display 615 may display content (e.g., a moving image) input through a communication unit 650 or an input/output unit 670.

Also, the display 615 may output an image stored in the memory 690 under the control by the processor 680. The display 615 may display a voice user interface (UI) (e.g., a UI including a voice command guide) for performing a voice recognition task corresponding to voice recognition or a motion UI (e.g., a UI including a user motion guide for motion recognition) for performing a motion recognition task corresponding to motion recognition.

An audio processing unit 620 (e.g., including audio processing circuitry) processes audio data. The audio processing unit 620 may perform various processing such as decoding or amplification, and noise filtering on the audio data. The audio processing unit 620 may include a plurality of audio processing modules to process audio data corresponding to a plurality of pieces of content.

The audio output unit 625 (e.g., including audio output circuitry) outputs audio included in a broadcast signal received through the tuner unit 640 under the control of the processor 680. The audio output unit 625 may output audio (e.g., voice or sound) input through the communication unit 650 or the input/output unit 670. Also, the audio output unit 625 may output an audio stored in the memory 690 under the control of the processor 680. The audio output unit 625 may include at least one of a speaker 626, a headphone output port 627, or an S/PDIF interface output port 628. The audio output unit 625 may include a combination of the speaker 626, the headphone output port 627, and the S/PDIF output port 628.

A power supply unit 630 (e.g., including a power supply) supplies power input from an external power supply source to elements (e.g., 610 to 690) in the display device 600 under the control of the processor 680. Also, the power supply unit 630 may supply power output from one or more batteries (not shown) located in the display device 600 to the elements (e.g., 610 to 690) under the control of the processor 680.

The tuner unit 640 (e.g., including a tuner) may tune and select only a frequency of a channel to be received by the display device 600 from among radio wave components by performing amplification, mixing, and/or resonance on a broadcast signal that is received by wire or wirelessly. The broadcast signal includes audio, video, and additional information (e.g., an electronic program guide (EPG)).

The tuner unit 640 may receive a broadcast signal in a frequency band corresponding to a channel number (e.g., a cable channel number 506) according to a user input (e.g., an input of a control signal received from an external control device (not shown), e.g., a remote controller, such as a channel number input, a channel up or down input, or a channel input on an EPG screen).

The tuner unit 640 may receive a broadcast signal from any of various sources such as a terrestrial broadcasting station, a cable broadcasting station, a satellite broadcasting station, or an Internet broadcasting station. The tuner unit 640 may receive a broadcast signal from a source such as an analog broadcasting station or a digital broadcasting station. The broadcast signal received through the tuner unit 640 is decoded (e.g., audio-decoded, video-decoded, and/or additional information-decoded) and is separated into an audio, a video, and/or additional information. The separated audio, video, and/or additional information may be stored in the memory 690 under the control of the processor 680.

The display device 600 may include one or more tuner units 640. According to an embodiment, when a plurality of tuner units 640 are provided, a plurality of broadcast signals may be output to a plurality of partial screens included in a multi-view screen provided to the display 615.

The tuner unit 640 may be implemented as any of an all-in-one tuner, a separate device including a tuner unit electrically connected to the display device 600 (e.g., a set-top box (not shown)), or a tuner unit (not shown) connected to the input/output unit 670.

The communication unit 650 (e.g., including communication circuitry) may communicate with an external electronic device (not shown) under the control of the processor 680. The processor 680 may transmit/receive content to/from an external device connected through the communication unit 650, and may download an application from the external device or may perform web browsing. In detail, the communication unit 650 may be connected to a network and may receive content from an external device (not shown). Also, the communication unit 650 may include at least one of a short-range communication module (not shown), a wired communication module (not shown), and a mobile communication module (not shown).

In FIG. 6, the communication unit 650 includes one of a wireless local area network (LAN) 651, a Bluetooth communication unit 652, and a wired Ethernet 653.

Also, the communication unit 650 may include a module combination including at least one of the wireless LAN 651, the Bluetooth communication unit 652, and the wired Ethernet 653. The communication unit 650 may receive a control signal of a control device (not shown) under the control of the processor 680. The control signal may be implemented as a Bluetooth-type signal, a radio frequency (RF) signal-type signal, or a Wi-Fi-type signal.

The communication unit 650 may further include another short-range communication module (e.g., NFC) or a separate BLE module, in addition to Bluetooth.

A detection unit 660 (e.g., including detection circuitry) detects a user's voice, image, or interaction.

The microphone 661 receives a voice uttered by the user. The microphone 661 may convert the received voice into an electrical signal and may output the electrical signal to the processor 680. The user's voice may include a voice corresponding to a menu or a function of the display device 600. For example, a distance of 4 m or less from the microphone 661 to a location of the user is recommended as a range of voice recognition with respect to the microphone 661, and the range of voice recognition with respect to the microphone 661 may vary according to a volume of the voice of the user and a surrounding environment (e.g., speaker sound or nearby noise).

The microphone 661 may be implemented as one body or a separate body with respect to the display device 600. When implemented as a separate body, the microphone 661 may be electrically connected to the display device 600 through the communication unit 650 or the input/output unit 670.

It will be easily understood by one of ordinary skill in the art that the microphone 661 may be excluded according to the performance and structure of the display device 600.

The camera unit 662 (e.g., including a camera) receives an image (e.g., consecutive frames) corresponding to a motion of the user including a gesture within a camera recognition range. For example, a recognition range of the camera unit 662 may range from 0.1 m to 5 m from the camera unit 662 to the user. The motion of the user may include a motion of a body part of the user such as the user's face, facial expression, hand, fist, or finger, or a motion of a part of the user. The camera unit 662 may convert the received image into an electrical signal and may output the electrical signal to the processor 680 under the control by the processor 680.

The processor 680 may select a menu displayed by the display device 600 using a recognition result of the received motion, or may perform control corresponding to the motion recognition result. For example, channel adjustment, volume control, and indicator movement may be performed.

The camera unit 662 may include a lens (not shown) and an image sensor (not shown). The camera unit 662 may support optical zoom or digital zoom using a plurality of lenses and/or image processing. The recognition range of the camera unit 662 may be variably set according to an angle of the camera and a surrounding environment condition. When the camera unit 662 includes a plurality of cameras, the camera unit 662 may receive a three-dimensional (3D) still image or a 3D motion using the plurality of cameras.

The camera unit 662 may be integrated to or separated from the display device 600. A separate device (not shown) including the separated camera unit 662 may be electrically connected to the display device 600 through the communication unit 650 or the input/output unit 670.

It will be easily understood by one of ordinary skill in the art that the camera unit 662 may be excluded according to the performance and structure of the display device 600.

A light receiver 663 receives an optical signal (including a control signal) from an external control device (not shown) through an optical window (not shown) of a bezel of the display 615. The light receiver 663 may receive an optical signal corresponding to a user input (e.g., a touch, push, touch gesture, voice, or motion) from a control device (not shown). A control signal may be extracted from the received optical signal under the control by the processor 680.

The input/output unit 670 (e.g., including input/output circuitry) receives video (e.g., a moving image), audio (e.g., voice or music), and additional information (e.g., EPG) from the outside of the display device 600 under the control of the processor 680. The input/output unit 670 may include one or more of a high-definition multimedia interface (HDMI) port 671, a component jack 672, a PC port 673, or a USB port 674. The input/output unit 670 may include a combination of the HDMI port 671, the component jack 672, the PC port 673, and the USB port 674.

It will be easily understood by one of ordinary skill in the art that a configuration and operation of the input/output unit 670 may vary according to embodiments of the disclosure.

The processor 680 (e.g., including processing circuitry) controls an overall operation of the display device 600 and a signal flow between elements (not shown) in the display device 600, and processes data. When there is a user input or a preset stored condition is satisfied, the processor 680 may execute an operating system (OS) and various applications stored in the memory 690.

The processor may include a graphics processing unit (not shown) for graphics processing on a video. The graphics processing unit (not shown) generates a screen including various objects such as an icon, an image, and text using a calculation unit (not shown) and a rendering unit (not shown). The calculation unit calculates an attribute value of each object to be displayed such as a coordinate value, a shape, a size, and a color according to a layout of the screen using user interaction detected by a detection unit (not shown). The rendering unit generates a screen of various layouts including an object based on the attribute value calculated by the calculation unit. The screen generated by the rendering unit is displayed on a display area of the display 615.

Figure 7:
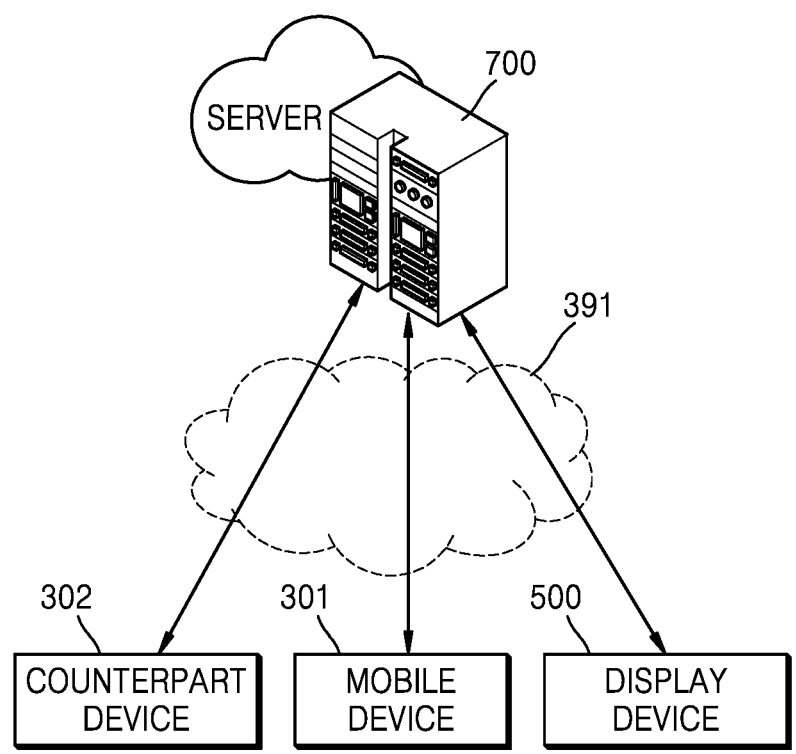
FIG. 7 is a diagram for describing communication between a server supporting a video call service and a display device according to various embodiments.

FIG. 7 is a diagram for describing communication between a server supporting a video call service and a display device, according to various embodiments. In FIG. 7, the same elements as those in FIGS. 1A, 1B, 2, 3, 4, and 5 are denoted by the same reference numerals. Also, the display device 500 of FIG. 7 may be the display device 100 or 400 of FIGS. 1A, 1B, 2, 3, and 4.

Referring to FIG. 7, the server 700 may communicate with the mobile device 301, the counterpart device 302, and the display device 500 through a wireless communication network 391.

For example, the server 700 may be a server that provides a video call or a video call service, or a server that supports communication required for a video call service. For example, at least two of the mobile device 301, the counterpart device 302, and the display device 500 may be connected through a mobile communication network such as 3G, 4G, or 5G, and a video call may be performed between the mobile device 301 or the display device 500 and the counterpart device 302. In this case, the server 700 may be a communication server that supports mobile communication according to a communication standard such as 3G, 4G, or 5G.

Also, the mobile device 301, the counterpart device 302, and the display device 500 may be connected through an Internet communication network. Each of at least two of the mobile device 301, the counterpart device 302, and the display device 500 may perform a video call through an application providing a video call service in the device. Accordingly, the mobile device 301, the counterpart device 302, and the display device 500 may perform a video call through the application or may perform a video call according to device switching. In this case, the server 700 may be a server that supports an application for providing a video call service. In detail, the server 700 may be, for example, a server of an entity or a user who manufactures and/or distributes the application.

As described above, operations required to perform a video call may be performed using a communication relay operation of the server 700. Although the communication relay operation of the server 700 is not shown in FIG. 3, the communication relay operation of the server 700 may be included in transmitting and receiving data or a signal between two different devices. In detail, the server 700 may be in charge of transmitting data or a signal, to support execution (or switching execution) of a video call service.

For example, the server 700 may perform a relay operation of transmitting a user image signal generated by the display device 500 to a counterpart device. Also, the server 700 may transmit or deliver various data and signals used to perform a video call service to at least one of the mobile device 301, the counterpart device 302, and the display device 500.

In the following description, even when it is described that certain data or a signal is transmitted from one device (e.g., the display device) to another device (e.g., the counterpart device), it may include transmitting the certain data or signal from the one device (e.g., the display device) to the other device (e.g., the counterpart device) through a communication relay operation of the server 700 as well as transmitting the certain data or signal directly from the one device (e.g., the display device) to the other device (e.g., the counterpart device).

Operations performed by the display device 103, 400, 500, or 600 according to various embodiments will be described in detail with reference to FIGS. 8 to 25.

Figure 8:
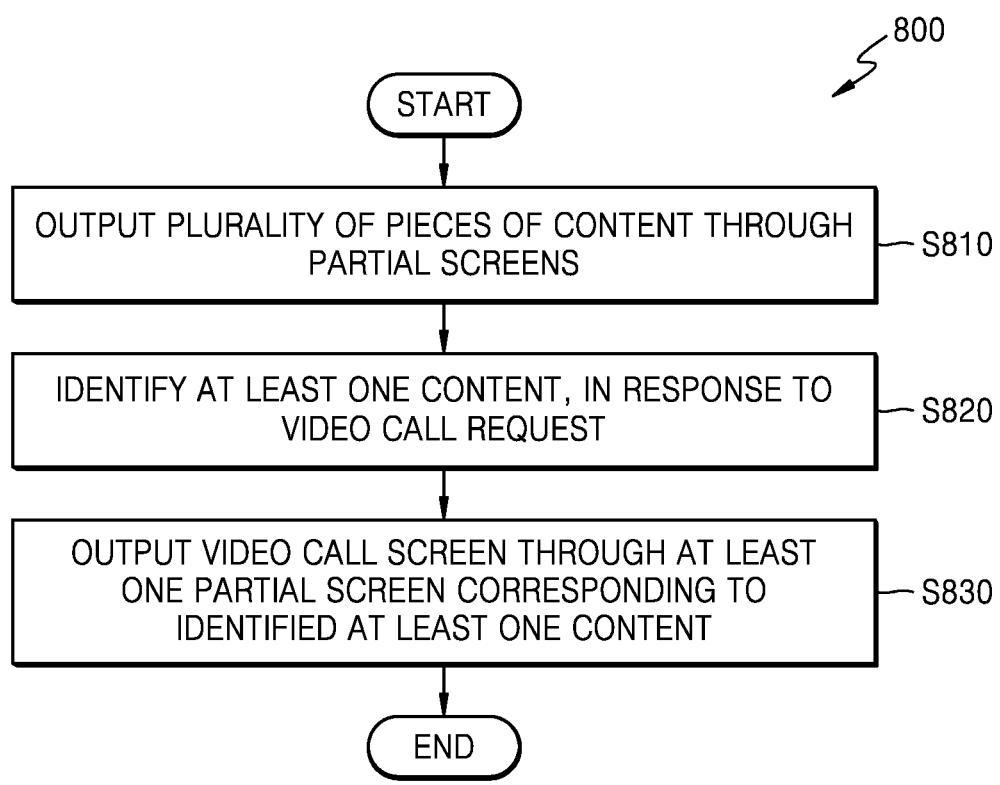
FIG. 8 is a flowchart illustrating an example operating method of a display device, according to various embodiments.

FIG. 8 is a flowchart illustrating an example operating method of a display device, according to various embodiments. Also, an example operating method 800 of a display device of FIG. 8 includes operations performed by a display device according to various embodiments of the disclosure, for example, the display device 100, 400, 500, or 600. Hence, when operations included in the operating method 800 of the display device according to various embodiments are described, the same description as that made for operations of the display device 100, 400, 500, or 600 of FIGS. 1A to 7 will not be repeated.

The following will be described assuming that the operating method 800 of the display device is performed by the display device 500 of FIG. 5, but again, the disclosure is not limited in this respect.

Referring to FIG. 8, the operating method 800 of the display device may be performed by a display device (e.g., 500) that displays a multi-view screen including a plurality of partial screens.

The operating method 800 of the display device includes outputting a plurality of pieces of content, which are individually decoded, through the plurality of partial screens included in the multi-view screen (S810). Operation S810 may be performed by the display 420 under the control of the processor 410.

Based on a video call request received after operation S810, at least one of the plurality of pieces of content is identified (S820). In detail, operation S820 may include identifying at least one content having a resolution corresponding to a video call screen from among the plurality of pieces of content, in response to the video call request. Operation S820 may be performed by the processor 410. In detail, the processor 410 may determine whether there is content having a resolution corresponding to a resolution of the video call screen from among the plurality of pieces of content output through the multi-view screen.

The video call request may be received based on a user input that is input through the user interface 450. For example, a user of the display device 500 may want to make a video call with his/her friend while watching the multi-view screen. Then, the user may input a user input for requesting a video call through the user interface 450 of the display device 500. Then, the processor 410 may recognize that the video call request has been received based on the user input. Alternatively, the video call request may be received from an electronic device (e.g., 302 of FIG. 3) of a counterpart who wants to make a video call with the user of the display device 500. That is, the video call request may be received according to a request of at least one of the user of the display device 500 or a user of a counterpart device (e.g., 302 of FIG. 3).

In an embodiment of the disclosure, the content identified in operation S820 may be content having the same resolution as a resolution of the video call screen.

Alternatively, the content identified in operation S820 may be content having a lowest resolution from among the plurality of pieces of content output through the multi-view screen.

Alternatively, the content identified in operation S820 may be content having an offset resolution from among the plurality of pieces of content output through the multi-view screen.

The offset resolution may refer, for example, to a resolution having a preset value. For example, the offset resolution may be determined based on at least one of settings of the display device, settings of a multi-view application, settings of a video call application, settings of the user of the display device, settings of a manufacturer of the display device, settings of a provider of the multi-view application, or settings of a provider of the video call application.

Also, the offset resolution may be set as a specified value, or may be set to a relative value.

For example, according to the settings of the multi-view application, the offset resolution may be set to any one of 1K, 2K, 4K, or 8K. Alternatively, according to the settings of the multi-view application, the offset resolution may be set to a lowest resolution from among resolutions of the plurality of pieces of content output through the multi-view screen. Alternatively, according to the settings of the multi-view application, the offset resolution may be set to a highest resolution from among resolutions of the plurality of pieces of content output through the multi-view screen. Alternatively, according to the settings of the video call application, the offset resolution may be set to a lowest resolution from among resolutions of the plurality of pieces of content output through the multi-view screen. Alternatively, according to the settings of the video call application, the offset resolution may be set to a resolution value of the video call screen. Alternatively, according to the settings of the video call application, the offset resolution may be set to a resolution value that is the same as or most similar to a resolution value of the video call screen (with a smallest difference between resolution values) from among resolutions of the plurality of pieces of content output through the multi-view screen.

Alternatively, the content identified in operation S820 may be content output through a main screen from among the plurality of pieces of content output through the multi-view screen.

Alternatively, the content identified in operation S820 may be content output through a preset partial screen from among the plurality of pieces of content output through the multi-view screen.

Alternatively, the content identified in operation S820 may be at least one content, which is played last (e.g., for which play was most recently initiated), from among the plurality of pieces of content output through the multi-view screen.

An identification operation of operation S820 will be described in detail with reference to FIGS. 17 to 25.

When an image signal corresponding to the video call screen is received as one image signal (hereinafter, referred to as an 'integrated image signal' for convenience of explanation), the processor 410 may identify one content having a resolution corresponding to the integrated image signal from among the plurality of pieces of content (S820). An operation of identifying one content in operation S820 will be described in detail with reference to FIGS. 17 to 21.

In an embodiment, when an image signal corresponding to the video call screen is received as two image signals, that is, a user image signal and a counterpart image signal, the processor 410 may identify two pieces of content having resolutions respectively corresponding to the user image signal and the counterpart image signal from among the plurality of pieces of content (S820). An operation of identifying two pieces of content in operation S820 will be described in detail with reference to FIGS. 22 to 25.

Subsequently, the operating method 800 of the display device includes outputting the video call screen through at least one partial screen corresponding to the at least one content identified in operation S820 from among the plurality of partial screens (S830). Operation S830 may be performed by the display 420 under the control of the processor 410.

According to a display device and an operating method thereof according to an embodiment of the disclosure, a display device outputting a multi-view screen may provide a video call service together without ending or interrupting the multi-view screen.

According to a display device and an operating method thereof according to an embodiment of the disclosure, a video call service may also be provided without ending or interrupting a multi-view screen, thereby increasing user satisfaction.

According to a display device and an operating method thereof according to an embodiment of the disclosure, a display device that receives a video call request while outputting a multi-view screen may provide a video call service while continuously outputting the multi-view screen, to increase user satisfaction. Accordingly, user satisfaction and user convenience may be increased.

FIG. 9 is a flowchart illustrating an example operating method of a display device, according to various embodiments. Also, an operating method 900 of a display device of FIG. 9 includes operations performed by a display device according to various embodiment, for example, the display device 100, 400, 500, or 600. Also, the operating method 900 of the display device of FIG. 9 may be a more detailed description of the operating method 800 of the display device.

When the operating method 900 of the display device is described, the same operations as those of the operating method 800 of the display device are denoted by the same reference numerals, and thus, a description thereof will not be repeated. The following will be described assuming that the operating method 900 of the display device is performed by the display device 500 of FIG. 5.

Referring to FIG. 9, operation S830 may include operations S831, S832, and S833.

In detail, in the example operating method 900 of the display device, operation S830 of outputting the video call screen may include operation S831 in which at least one decoder (not shown) included in the display device 500 stops decoding the at least one content identified in operation S820, operation S832 in which the decoder (not shown) that has stopped decoding decodes an image signal corresponding to the video call screen, and operation S833 in which the video call screen is output through at least one partial screen on which the identified at least one content has been output based on the image signal decoded in operation S833.

Operations S831, S832, and S833 will be described in detail with reference to FIG. 10.

Figure 10:
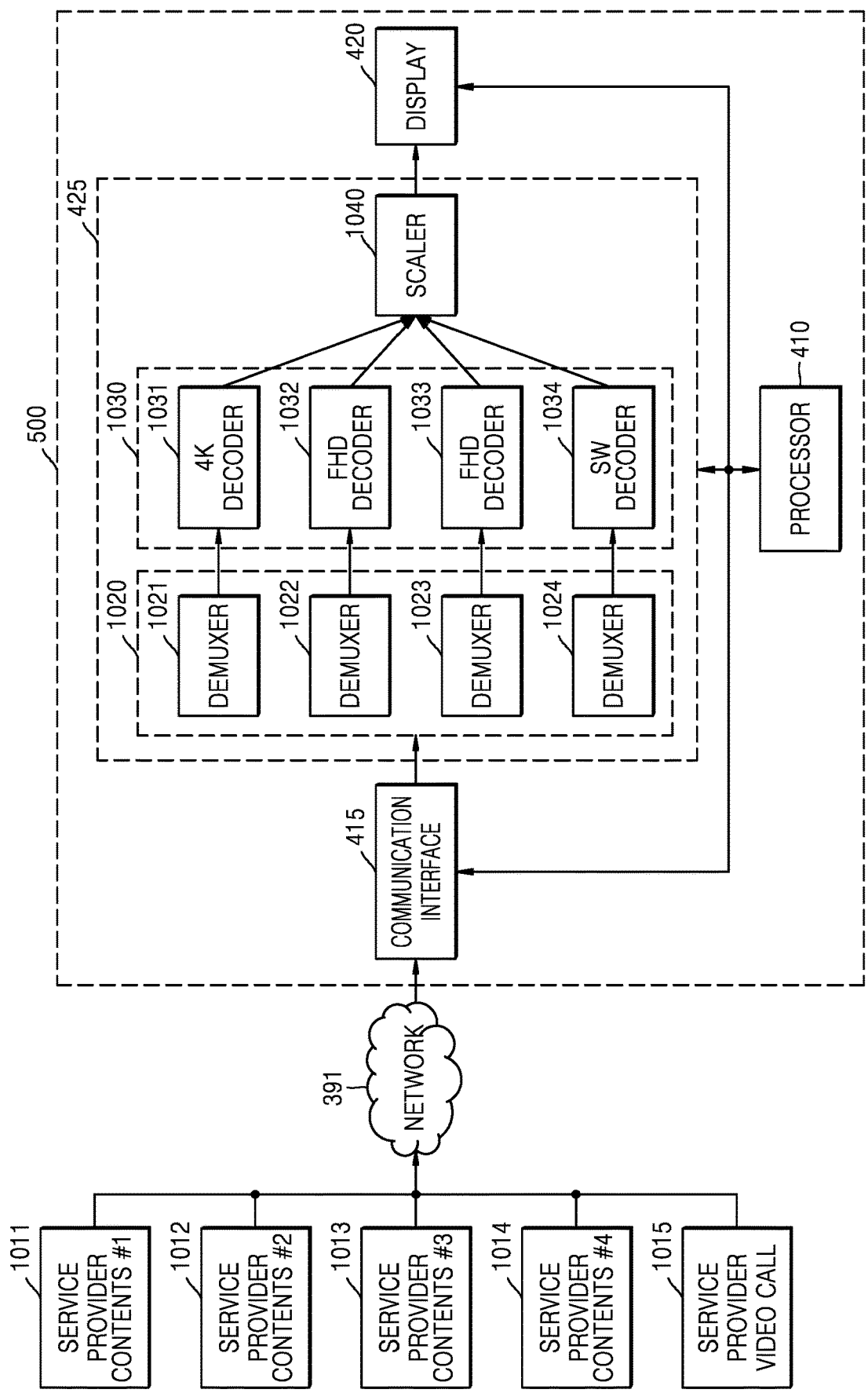
FIG. 10 is a diagram illustrating an example display device, according to various embodiments.

FIG. 10 is a diagram illustrating a display device, according to various embodiments. FIG. 10 is a detailed diagram illustrating the video processing unit 425 of the display device 500 of FIG. 5. Also, in the display device 500 of FIG. 10, elements that do not require additional explanation among elements included in the display device 500 of FIG. 5 are not shown.

Referring to FIG. 10, the video processing unit 425 may perform image processing on video data. In detail, the display device 500 may receive a plurality of image signals corresponding to a plurality of pieces of content through the communication interface 415. A 'service provider' in FIG. 10 may, for example, be a server, an electronic device, or a broadcasting station that provides content displayed through the display device 500.

Referring to FIGS. 1A and 10 together, a service provider 1011 may provide first content that is broadcast content corresponding to a music program, a service provider 1012 may provide second content that is broadcast content corresponding to a soccer game, a service provider 1013 may provide third content that is video streaming content corresponding to a volleyball game rather than a real-time broadcast or live broadcast, and a service provider 1014 may provide fourth content that is Internet content provided by a portal site.

The communication interface 415 may receive a first image signal corresponding to the first content, a second image signal corresponding to the second content, a third image signal corresponding to the third content, and a fourth image signal corresponding to the fourth content, through the communication network 391.

The image signals received by the communication interface 415 may be transmitted to and decoded by the video processing unit 425 under the control of the processor 410.

The video processing unit 425 may perform image processing on video data. In detail, the video processing unit 425 may demultiplex an input image signal, may decode the demultiplexed image signal, and may scale the decoded image signal to an image frame to be output from the display 420. Accordingly, a plurality of image signals input to the video processing unit 425 may be output as a plurality of images displayed on a plurality of partial screens.

In detail, the video processing unit 425 may include a demultiplexer 1020, a multi-decoder 1030, and a scaler 1040.

An image signal that is in the form of a stream, is multiplexed, and is compressed according to a certain codec (or standard) may be received by the display device 500. Accordingly, the video processing unit 425 may receive an image signal multiplexed, compressed, and generated as a stream, may demultiplex and decompress the input image signal, and may output the same as image data with an RGB or YUV format that may be displayed on the display 420.

The demultiplexer 1020 may receive a plurality of image signals, and may demultiplex each of the plurality of image signals. In detail, the demultiplexer 1020 may include a plurality of demuxers 1021, 1022, 1023, and 1024 that are connected in parallel. Each demuxer may demultiplex one image signal.

The multi-decoder 1030 may include a plurality of decoders. In detail, the multi-decoder 1030 may include a plurality of decoders having different resolutions. The term 'decoder having a certain resolution' may refer, for example, to a decoder capable of decoding an image signal having the certain resolution. That is, a 'decoder having a certain resolution' may refer to a decoder supporting processing of an image signal having the certain resolution.

The number and specifications of decoders included in the multi-decoder 1030 may vary according to product specifications, product grade, release year, etc. of the display device 500, in various ways. Also, specifications of a decoder may vary according to a processable bit rate, a supportable resolution, a supportable codec (e.g., HEVC, H.264, or MEPG), etc. An individual decoder included in the multi-decoder 1030 may be designed to decompress compression according to at least one codec, or may support decompression of a plurality of codecs.

Also, detailed configurations and arrangements of the demultiplexer 1020, the multi-decoder 1030, and the scaler 10740 included in the video processing unit 425 may vary according to product specifications, product grade, etc.

For example, the multi-decoder 1030 may include a 4K decoder 1031 for decoding an image signal having a resolution of 4K, two 2K (FHD—Full high Definition) decoders 1032 and 1033 for decoding an image signal having a resolution of 2K, and a software (SW) decoder 1034.

Also, the 4K decoder 1031 may decode an image signal having a resolution of 4K or less. The 2K (FHD) decoders 1032 and 1033 may decode an image signal having a resolution of 2K or less. The SW decoder 1034 may be designed to perform software decoding, and perform decoding corresponding to various codecs.

Also, each of a plurality of decoders included in the multi-decoder 1030 may decode two or more pieces of content using time division. For example, two image signals corresponding to two pieces of 2K content may be decoded using one 2K decoder 1032.

An image signal decoded through the multi-decoder 1030 may be scaled by the scaler 1040 and may be output to the display 420. In detail, the scaler 1040 may scale the decoded image signal to an image frame output from the display 420.

Referring back to FIG. 1A, it is assumed that the first content is 4K content, and thus a first image signal is transmitted as a 4K image signal; the second content is 2K content, and thus, a second image signal is transmitted as a 2K image signal; the third content is a 2K content, and thus, a third image signal is transmitted as a 2K image signal; and the fourth content is 1K content, and thus, a fourth image signal is transmitted as a 1K image signal.

Referring to FIGS. 1A and 10 together, in the above example, the first image signal corresponding to 4K content is decoded by the 4K decoder 1031. The second image signal corresponding to 2K content is decoded by the 2K decoder 1032. The second image signal corresponding to 2K content is decoded by the 2K decoder 1033. The image signal corresponding to the fourth content that is 1K content is decoded by the SW decoder 1033.

The scaler 1040 may receive the decoded first image signal, the decoded second image signal, the decoded third image signal, and the decoded fourth image signal, and may scale each image signal to an image frame corresponding to each of a plurality of split screens included in the multi-view screen 110. For example, the scaler 1040 may scale the decoded first image signal to a first image frame corresponding to the first partial screen 120, may scale the decoded second image signal to a second image frame corresponding to the second partial screen 130, may scale the decoded third image signal to a third image frame corresponding to the third partial screen 140, and may scale the decoded fourth image signal to a fourth image frame corresponding to the fourth partial screen 150.

Also, the scaler 1040 may mix the scaled first to fourth image frames and may generate and output an image frame corresponding to the multi-view screen 110. Alternatively, the scaler 1040 may not mix the first to fourth image frames scaled by the scaler 104, and may output the scaled first to fourth image frames as they are through split partial screens of the display 420. Accordingly, the display 420 may display the multi-view screen 110 of FIG. 1A.

As described above, when a video call request is received while the multi-view screen 110 is displayed, the display device 500 may identify at least one content by performing operation S820.

Through an identification operation of operation S820, the display device 500 may secure hardware and software resources required for decoding for a video call screen.

The following will be described assuming that the content identified in operation S820 is the first content. Then, the processor 410 may stop decoding the first content (S831). In detail, because the first content is decoded by the 4K decoder 1031, the 4K decoder 1031 stops decoding the first content. Accordingly, the 4K decoder 1031 may decode a signal other than the first image signal, for example, an image signal corresponding to the video call screen. That is, when the display device 500 stops decoding the first image signal, the use of hardware and/or software resources required for decoding for the video call screen, for example, the 4K decoder 1031, may be secured. That is, the display device 500 may perform decoding for the video call screen, using a decoder that has stopped decoding an image signal of selected content.

Subsequently, the 4K decoder 1031 that has stopped decoding the first content may decode an image signal corresponding to the video call screen (S833).

Accordingly, the video call screen (not shown) may be output through a partial screen, for example, the first partial screen 120, on which content, for example, the first content, identified in operation S820 has been output, based on the image signal decoded through the 4K decoder 1031.

As described with reference to FIG. 10, in a display device and an operating method according to an embodiment of the disclosure, when a video call request is received while a multi-view screen is output, at least one content from among a plurality of pieces of content output to the multi-view screen may be identified based on the video call request, and a decoder resource included in the display device may be managed so that a video call screen is output to a partial screen on which the identified content has been output. Accordingly, in a display device and an operating method according to an embodiment of the disclosure, a display device outputting a multi-view screen may provide a video call service together without ending or interrupting the multi-view screen.

Figure 11:
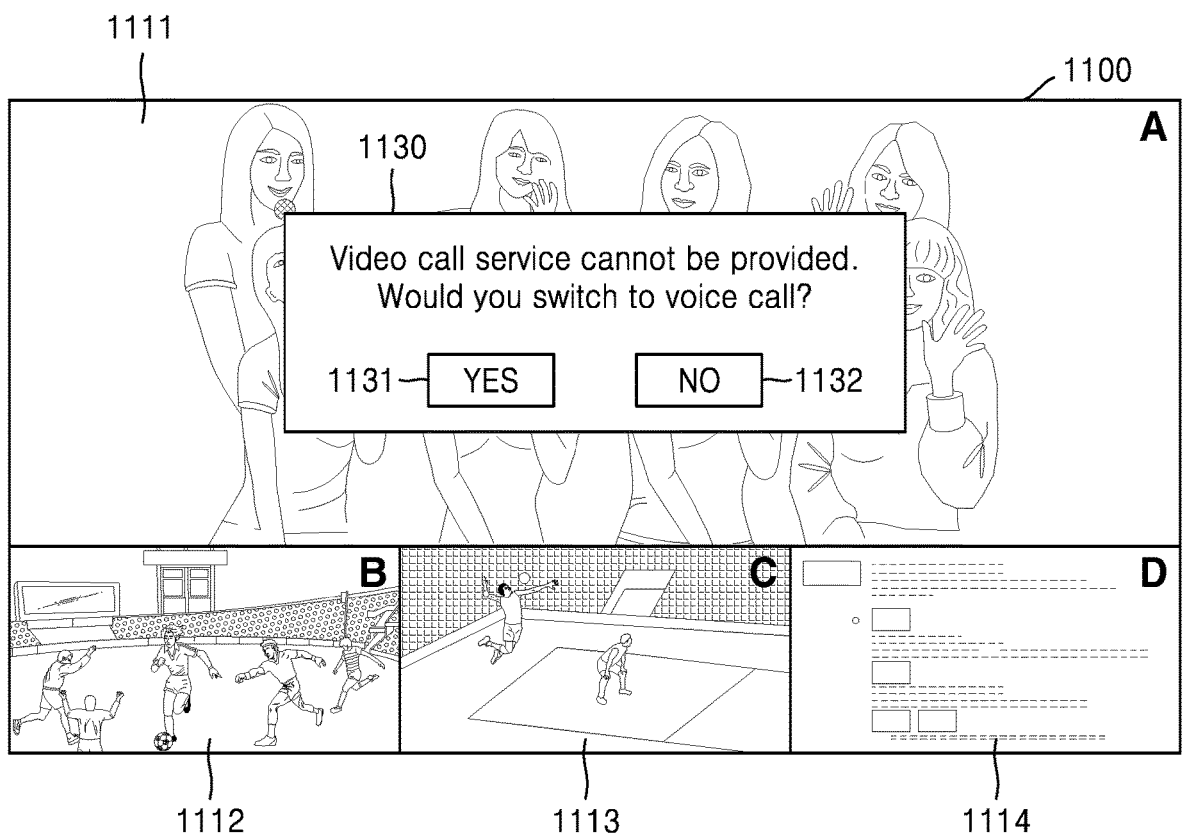
FIG. 11 is a diagram illustrating a view of an example user interface screen displayed by a display device, according to various embodiments.

FIG. 11 is a diagram illustrating a view of an example user interface screen displayed by a display device, according to various embodiments. In FIG. 11, four pieces of content are individually decoded and output through a multi-view screen having the layout 245 of FIG. 2. Also, first, second, third, and fourth content included in a multi-view screen 1100 of FIG. 11 correspond to first, second, third, and fourth content of FIG. 1A or 1B. The multi-view screen 1100 may correspond to the multi-view screen 111 of FIG. 1B. Accordingly, when the multi-view screen 1100 of FIG. 11 is described, the same description as that made for the multi-view screen 111 of FIG. 1B will not be repeated.

In an embodiment of the disclosure, content identified in operation S820 may be content having the same resolution as a resolution of a video call screen.

Referring back to FIG. 8, operation S820 may further include determining (not shown) whether there is at least one content having a resolution corresponding to the video call screen according to a video call request and performing (not shown) a voice call switching process when there is not at least one content having a resolution corresponding to the video call screen. An example embodiment of operation S820 will be described with reference to FIGS. 8 and 11.

In detail, when a video call screen according to a video call request has a resolution of 8K, the video call request may be a request for displaying a video call screen having a resolution of 8K. For example, the video call request may include information about a resolution of a video call screen which is requested. In this case, the processor 410 may determine whether there is content corresponding to a resolution of 8K from among a plurality of pieces of content output through a plurality of partial screens included in the multi-view screen 1100, based on the resolution information (specifically, information about a resolution of a video call screen which is requested) included in the video call request. Like in FIG. 1B, first content output through a first partial screen 1111 of the multi-view screen 1100 may be 4K content, second content output through a second partial screen 1112 may be 2K content, third content output through a third partial screen 1113 may be 2K content, and fourth content output through a fourth partial screen 1114 may be 1K content.

In the above example, because the resolution of the video call screen is 8K, there is no content having the same resolution as the resolution of the video call screen. In this case, the video call screen may not be output to a partial screen while the resolution of the video call screen is maintained. That is, there is no partial screen on which the video call screen having the resolution of 8K is to be output at a resolution of 8K. In this case, because the needs of a user who wants to receive a high-quality (specifically, high-resolution) video call service are not reflected, the processor 410 may not provide the video call service.

As described above, when there is no content having the same content as the resolution of the video call screen, the processor 410 may perform a voice call switching process. The voice call switching process may be a process for providing, when it is determined that a video call service may not be provided in response to a video call request, a voice call service instead of a video call.

The processor 410 may perform the voice call switching process based on a user input.

Referring to FIG. 11, when there is no content having the same resolution as the resolution of the video call screen as in the above example, the processor 410 may display a user interface menu 1130 for performing a voice call switching process. In FIG. 11, the user interface menu 1130 is displayed as a transparent text window in a portion of the multi-view screen 1100. Also, a size, a position, a degree of transparency, and/or a shape of the user interface menu 1130 may be determined in various ways.

When a user input that selects a menu 'YES' 1131 through the user interface menu 1130, the processor 410 may switch the video call request to a voice call and may provide a voice call service. When the voice call service is provided, there is no screen to be output (e.g., the video call screen). Accordingly, the processor 410 may continuously output the existing multi-view screen 1100. Also, to provide the voice call service, the processor 410 may stop outputting audio signals corresponding to at least one of pieces of content output through the multi-view screen 1100, and may output an audio signal corresponding to a voice call through a speaker (e.g., 460 of FIG. 5).

Alternatively, the processor 410 may stop outputting audio signals corresponding to a least one of pieces of content output through the multi-view screen 1100, and may output a caption message corresponding to an audio signal of each content. For example, a caption message corresponding to an audio signal of the first content may be output to the first partial screen 1111.

When a user input that selects a menu 'NO' 1132 is received through the user interface menu 1130, the processor 410 may end the voice call switching process without providing a voice call service. In detail, when a user input that selects the menu 'NO' 1132 is received, the processor 410 may continue to output the multi-view screen 1100, without providing a voice call and a voice call service.

Figure 12:
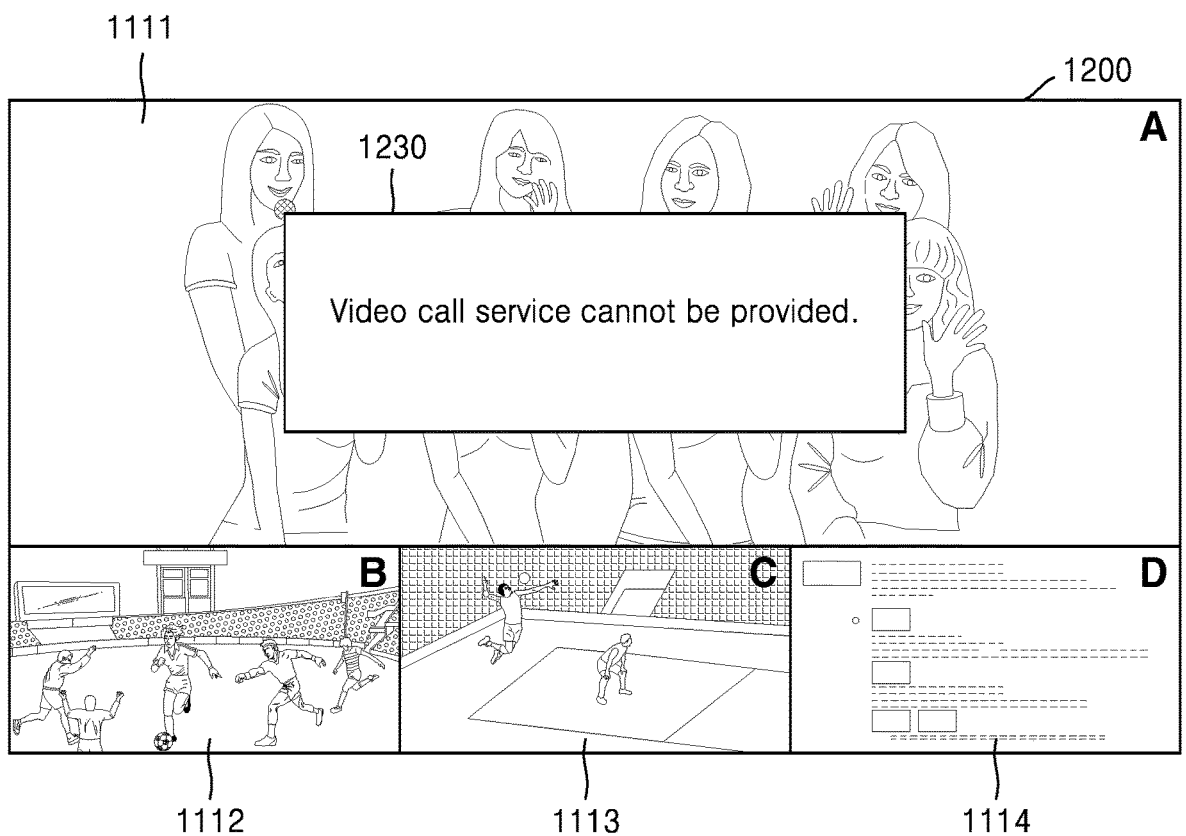
FIG. 12 is a diagram illustrating a view of an example user interface screen displayed by a display device, according to various embodiments.

FIG. 12 is a diagram illustrating a view of an example user interface screen displayed by a display device, according to various embodiments. In a multi-view screen 1200 of FIG. 12, the same elements as those of the multi-view screen 1100 of FIG. 11 are denoted by the same reference numerals.

In an embodiment of the disclosure, content identified in operation S820 may be content having the same resolution as a resolution of a video call screen. The following will be described assuming that the resolution of the video call screen is 8K.

Referring back to FIG. 8, operation S820 may further include determining (not shown) whether there is at least one content having a resolution corresponding to the video call screen according to a video call request and ending (not shown) a video call process when there is not at least one content having a resolution corresponding to the video call screen. An example embodiment of operation S820 will be described with reference to FIGS. 8 and 12.

In the above example, because the resolution of the video call screen is 8K, there is no content having the same resolution as the resolution of the video call screen. Accordingly, the processor 410 may end the video call process. In detail, the processor 410 may reject the video call request, and may control the multi-view screen 1200 to be continuously output.

Referring to FIG. 12, when the video call process ends, the processor 410 may display a message window 1230 saying 'Video call request has been rejected' or 'Video call service cannot be provided' on the multi-view screen 1200. In FIG. 12, the message window 1230 is output as an opaque text window, but the disclosure is not limited in this respect.

Figure 13:
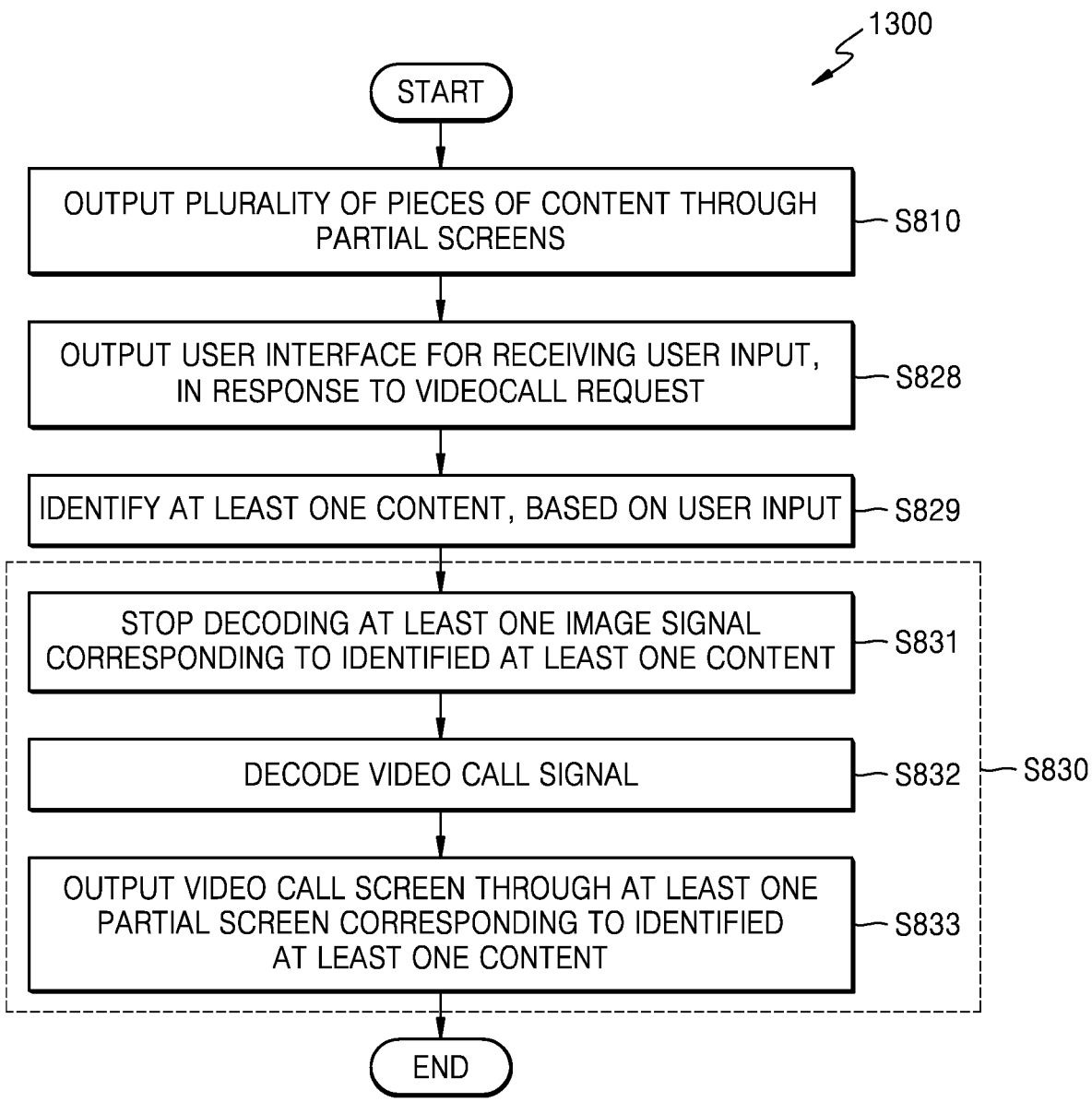
FIG. 13 is a flowchart illustrating an example operating method of a display device, according to various embodiments.

FIG. 13 is a flowchart illustrating an example operating method of a display device, according to various embodiments. In FIG. 13, the same operations as those in FIGS. 8 and 9 are denoted by the same reference numerals. Also, operation S829 of FIG. 13 may correspond to operation S820. Hence, the same description as that made above will not be repeated. Also, the following will be described assuming that an operating method 1300 of a display device is performed by the display device 500 of FIG. 5.

The operating method 1300 of the display device according to an embodiment of the disclosure may further include receiving (S828) a user input that selects at least one of a plurality of partial screens included in a multi-view screen, in response to a video call request, after operation S810.

In detail, operation S828 may include displaying (not shown) a user interface screen for selecting at least one of the plurality of partial screens in response to the video call request, and receiving (not shown) a user input that selects at least one of the plurality of partial screens through the user interface screen.

The operating method 1300 of the display device may include identifying (S829) at least one content from among a plurality of pieces of content output to the plurality of partial screens included in the multi-view screen based on the user input received in operation S828. Operation S829 may be performed by the processor 410.

Operation S829 of identifying content based on the user input will be described in detail with reference to FIGS. 15 to 16.

Figure 14:
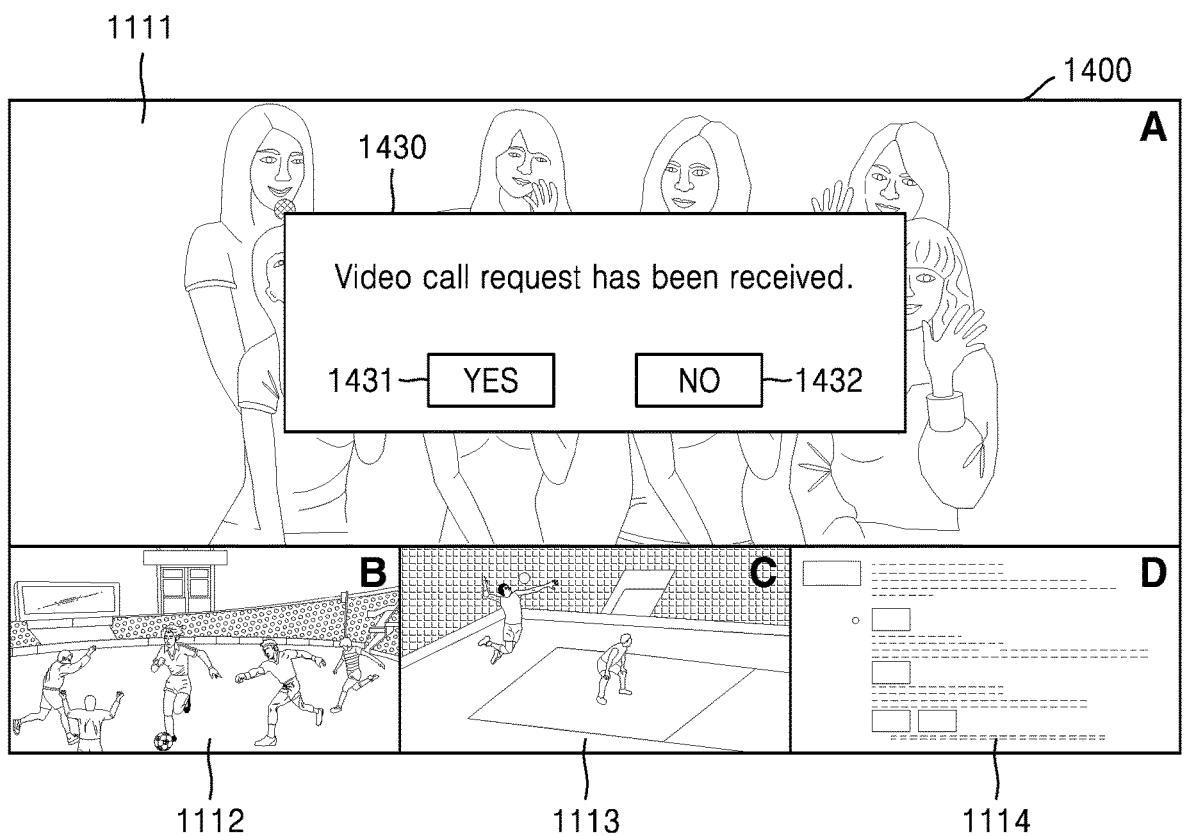
FIG. 14 is a diagram illustrating a view of an example user interface screen displayed by a display device, according to various embodiments.

FIG. 14 is a diagram illustrating a view of an example user interface screen displayed by a display device, according to various embodiments. In a multi-view screen 1400 of FIG. 14, the same elements as those of the multi-view screen 1100 of FIG. 11 are denoted by the same reference numerals.

In an embodiment of the disclosure, when a video call request is received, the processor 410 may output a user interface menu 1430 for receiving a user input regarding whether to accept the video call request.

The user interface menu 1430 may be a user interface menu for notifying that the video call request has been received and receiving a connection request or a connection rejection request. When a user input that selects a menu 'YES' 1431 is received, the processor 410 identifies at least one content from among a plurality of pieces of content output to partial screens of the multi-view screen 1400 (S829). An operation of identifying content is the same as that in operation S820, and thus a detailed description will not be repeated.

When a user input that selects a menu 'NO' 1432 is received through the user interface menu 1430, the processor 410 may continue to output the multi-view screen 1400, without providing a video call service.

Figure 15:
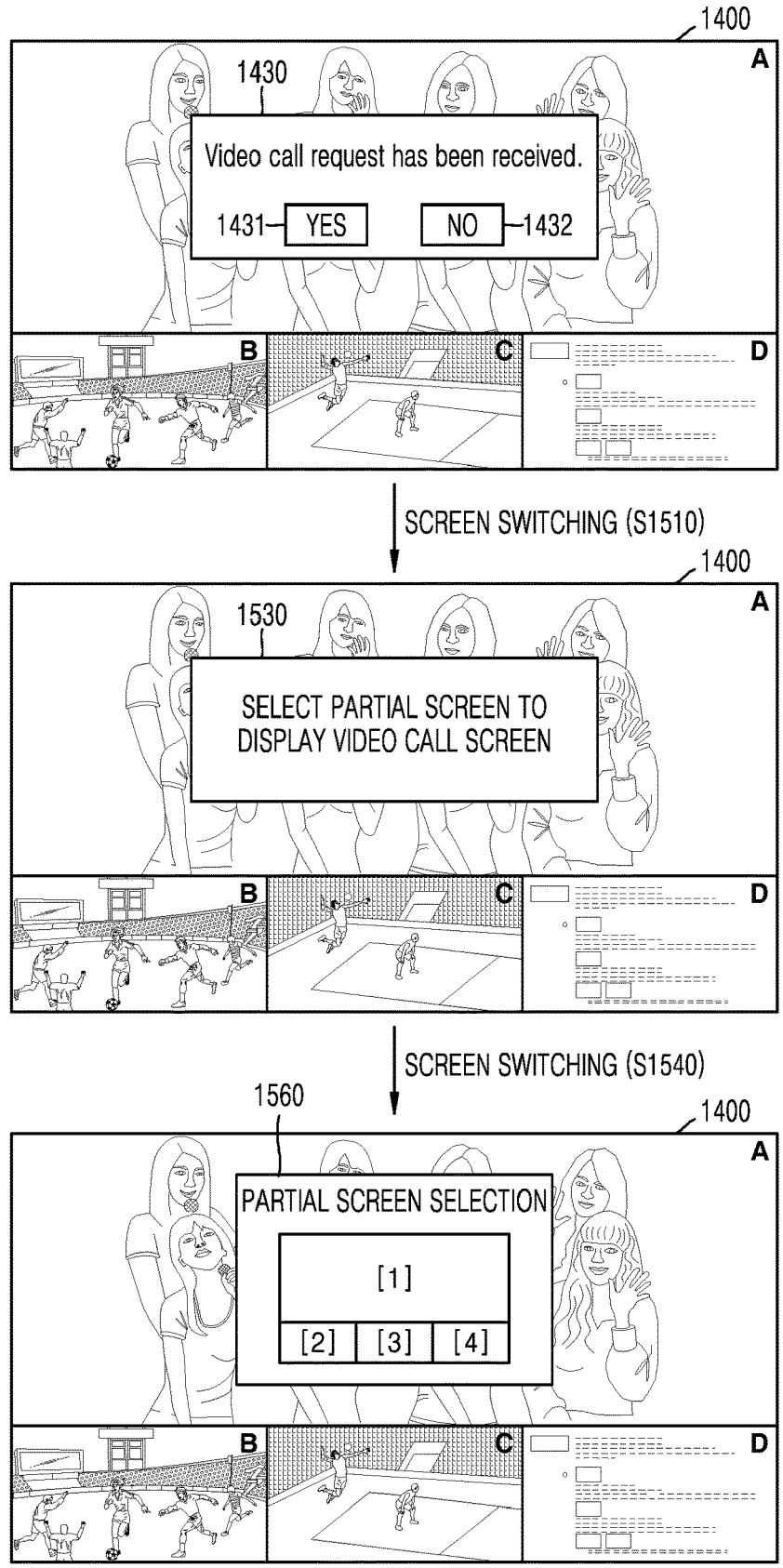
FIG. 15 is a diagram illustrating a view of example user interface screens displayed by a display device, according to various embodiments.

FIG. 15 is a diagram illustrating a view of example user interface screens displayed by a display device, according to various embodiments. In FIG. 15, the same elements as those in FIG. 14 are denoted by the same reference numerals.

Operation S828 of FIG. 13 may further include, in response to a user input that accepts a video call request (e.g., a user input that selects the menu 'YES' 1431 of FIG. 14), outputting (not shown) a user interface menu for selecting at least one of a plurality of partial screens included in the multi-view screen 1400.

In detail, referring to FIG. 15, in response to a user input that selects the menu 'YES' 1431, the processor 410 may perform screen switching S1510 to output a user interface menu 1530. For example, the processor 410 may output the user interface menu 1530 indicating partial screen selection which is a user interface screen. Subsequently, the processor 410 may output a user interface menu 1560 for partial screen selection, through screen switching S1540. Then, a user may select a partial screen to which a video call screen is to be output in the user interface menu 1560.

When the user's selection is received, the processor 410 may output the video call screen to the partial screen selected by the user. For example, when the user selects a first partial screen (display area '[1]'), the processor 410 may control the video call screen to be output through the first partial screen.

For example, when a resolution of first content output through the first partial screen and a resolution of the video call screen are the same, the processor 410 may decode the video call screen by using a decoder that has decoded the first content.

Alternatively, when a resolution of the first content output through the first partial screen and a resolution of the video call screen are different from each other, the processor 410 may up-scale or down-scale a resolution of an image signal corresponding to the video call screen, so that a resolution of the image signal corresponding to the video call screen is the same as a resolution of the decoder that has decoded the first content. Increasing a resolution of an image to be output may, for example, be referred to as up-scaling, and decreasing a resolution of an image to be output may, for example, be referred to as down-scaling. An up-scaling operation and a down-scaling operation may be performed by the processor 410. The processor 410 may control the video processing unit 425 to perform a decoding operation after the up-scaling operation or the down-scaling operation.

Also, for up-scaling or down-scaling, artificial intelligence (AI) scaling technology may be used. In detail, AI scaling technology refers to technology of adjusting a size or a resolution of an input image using a neural network according to AI technology. AI scaling technology may include AI ScaleNet technology. In detail, AI ScaleNet technology may, for example, refer to technology that uses a standard codec as it is and has equivalent compression performance at a bit rate of about half that of a reference codec through deep learning-based pre-processing and post-processing. The pre-processing may include encoding, and the post-processing may include decoding.

Scaling technology using AI may, for example, be referred to as an 'AI codec'. In an embodiment of the disclosure, the processor 410 may include an AI down-scaler (not shown) and an AI up-scaler (not shown) for performing an AI codec by itself. Also, the AI down-scaler (not shown) and the AI up-scaler (not shown) may be included in each of decoders included in the multi-decoder 1030 of FIG. 10.

In the above example, when the first partial screen is selected by a user input and the resolution of the first content output through the first partial screen is different from the resolution of the video call screen, the processor 410 may up-scale or down-scale an image signal corresponding to the video call screen using the AI codec, and may decode the up- or down-scaled image signal using a decoder that has decoded the first content. Accordingly, the video call screen may be output to the first partial screen on which the first content has been output.

Figure 16:
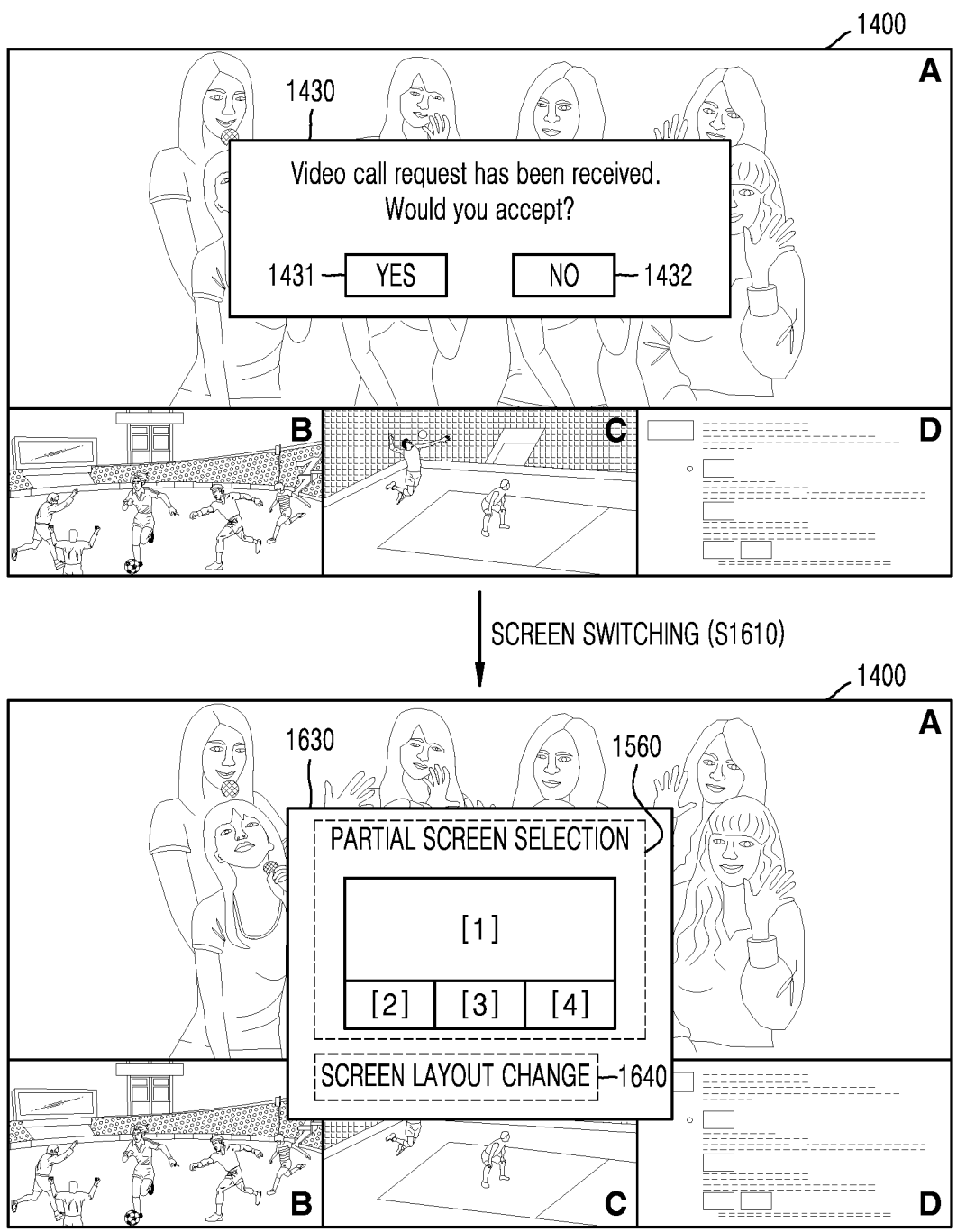
FIG. 16 is a diagram illustrating a view of example user interface screens displayed by a display device, according to various embodiments.

FIG. 16 is a diagram illustrating a view of example user interface screens displayed by a display device, according to various embodiments. In FIG. 16, the same elements as those in FIGS. 14 and 15 are denoted by the same reference numerals.

Referring to FIG. 16, after the multi-view screen 1400 including the user interface menu 1430 is output, the processor 410 may output a sub-window 1630 including a user interface menu 1560 for partial screen selection and a user interface menu 1640 for screen layout change, through screen switching S1610.

When a user wants a video call screen to be output through at least one partial screen included in a multi-view screen (e.g., 241, 242, 243, or 246 of FIG. 2) having a layout different from that of the current multi-view screen 1400, the user may change a screen layout using the user interface menu 1640 for screen layout change, and may select at least one partial screen included in the changed screen layout. Then, the processor 410 may output the video call screen through at least one selected partial screen in the changed layout.

Figure 17:
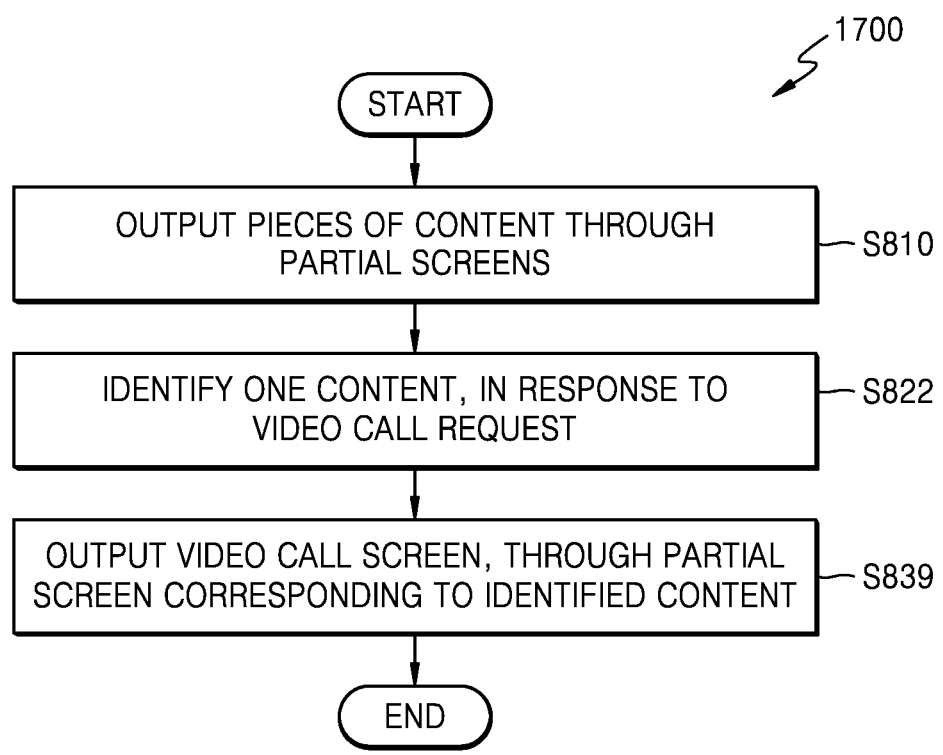
FIG. 17 is a flowchart illustrating an example operating method of a display device, according to various embodiments.

FIG. 17 is a flowchart illustrating an example operating method of a display device, according to various embodiments. In an operating method 1700 of a display device of FIG. 17, the same operations as those of the operating method 800 of the display device of FIG. 8 are denoted by the same reference numerals, and operations S822 and S839 may respectively correspond to operations S820 and S830 of FIG. 8. Accordingly, the same description as that made above will not be repeated.

The following will be described assuming that the operating method 1700 of the display device is performed by the display device 500 of FIG. 5.

As described above, when an image signal corresponding to an entire video call screen is received, the image signal may be an image signal having a resolution of 1K, 2K, 4K, or 8K. That is, the image signal corresponding to the video call screen may be an image signal indicating one image in which both a user image and a counterpart image are included. In this case, the image signal may be entirely decoded and may be output through one partial screen.

Accordingly, to output the video call screen, one partial screen included in a multi-view screen is required, and thus, it is sufficient to identify only one content.

Referring to FIG. 17, the operating method 1700 of the display device (e.g., 500) may include identifying one content from among a plurality of pieces of content output to a plurality of partial screens included in a multi-view screen, based on a video call request received after operation S810 (S822). In detail, in operation S822, one content may be identified based on the video call request. An operation of identifying one content will be described in detail with reference to FIGS. 19 to 21.

A video call screen may be output through a partial screen on which the content identified in operation S822 has been output (S839). Operation S839 will be described in detail with reference to FIG. 18. In the above example, the video call screen may be displayed through an identified partial screen.

For convenience of explanation, the following will be described assuming that content identified in operation S822 is 'first content' and a partial screen on which the 'first content' has been output is a 'first partial screen'. That is, in operation S822, the first content from among the plurality of pieces of content output through the multi-view screen may be identified, based on the video call request. In operation S823, the video call screen may be displayed through the first partial screen.

Figure 18:
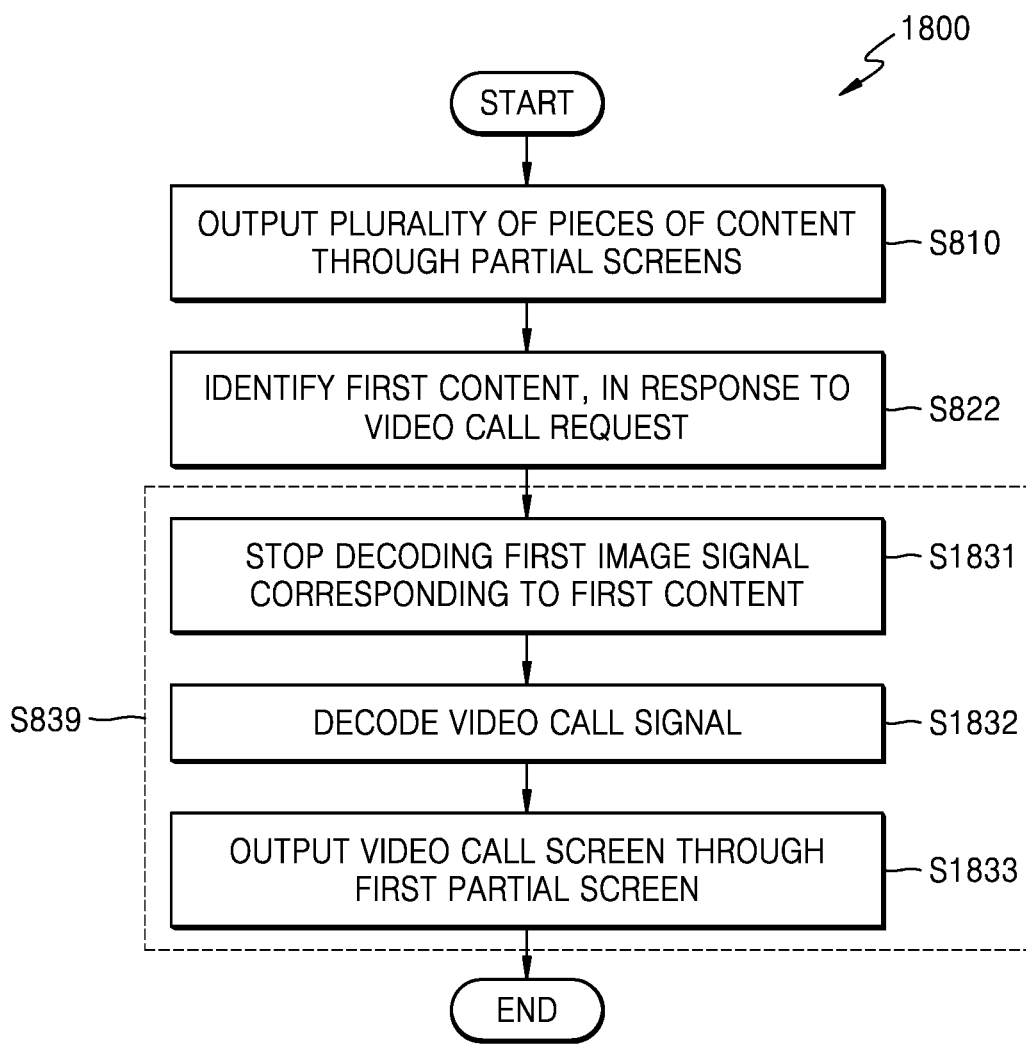
FIG. 18 is a flowchart illustrating an example operating method of a display device, according to various embodiments.

FIG. 18 is a flowchart illustrating an example operating method of a display device, according to various embodiments. When an operating method 1800 of a display device of FIG. 18 is described, the same operations as those of the operating method 1700 of the display device of FIG. 17 are denoted by the same reference numerals, and thus a description thereof will not be repeated.

The following will be described assuming that the operating method 1800 of the display device is performed by the display device 500 of FIG. 5.

Referring to FIG. 18, operation S839 of FIG. 17 may include operations S1831, S1832, and S1833. Operations S1831, S1832, and S1833 may respectively correspond to operations S831, S832, and S833 of FIG. 9, and thus, the same description as that made with reference to FIG. 9 will not be repeated.

In detail, in the operating method 1800 of the display device, operation S839 of outputting a video call screen may include operation S1831 in which any one decoder (not shown) included in the display device 500 stops decoding content identified in operation S822, operation S1832 in which the decoder (not shown) that has decoded the identified content decodes an image signal corresponding to the video call screen, and operation S1833 in which the video call screen is output through a partial screen on which the identified content has been output based on the image signal decoded in operation S1832. The 'decoder (not shown) that has decoded the identified content' may refer, for example, to a decoder that has stopped decoding.

Referring back to FIG. 10, a first image signal corresponding to 4K content is decoded by the 4K decoder 1031. A second image signal corresponding to 2K content is decoded by the 2K decoder 1032. A second image signal corresponding to 2K content is decoded by the 2K decoder 1033. An image signal corresponding to fourth content that is 1K content is decoded by the SW decoder 1033.

In the above example, when content identified in operation S822 is first content, the first content is decoded by the 4K decoder 1031. Hence, in operation S1831, the 4K decoder 1031 may stop decoding the first content, and in operation S1832, the 4K decoder 1031 may initiate decoding an image signal corresponding to a video call screen. Accordingly, the image signal decoded by the 4K decoder 1031 may be displayed through a first partial screen (specifically, a partial screen on which the first content has been output) (S1833).

Figure 19:
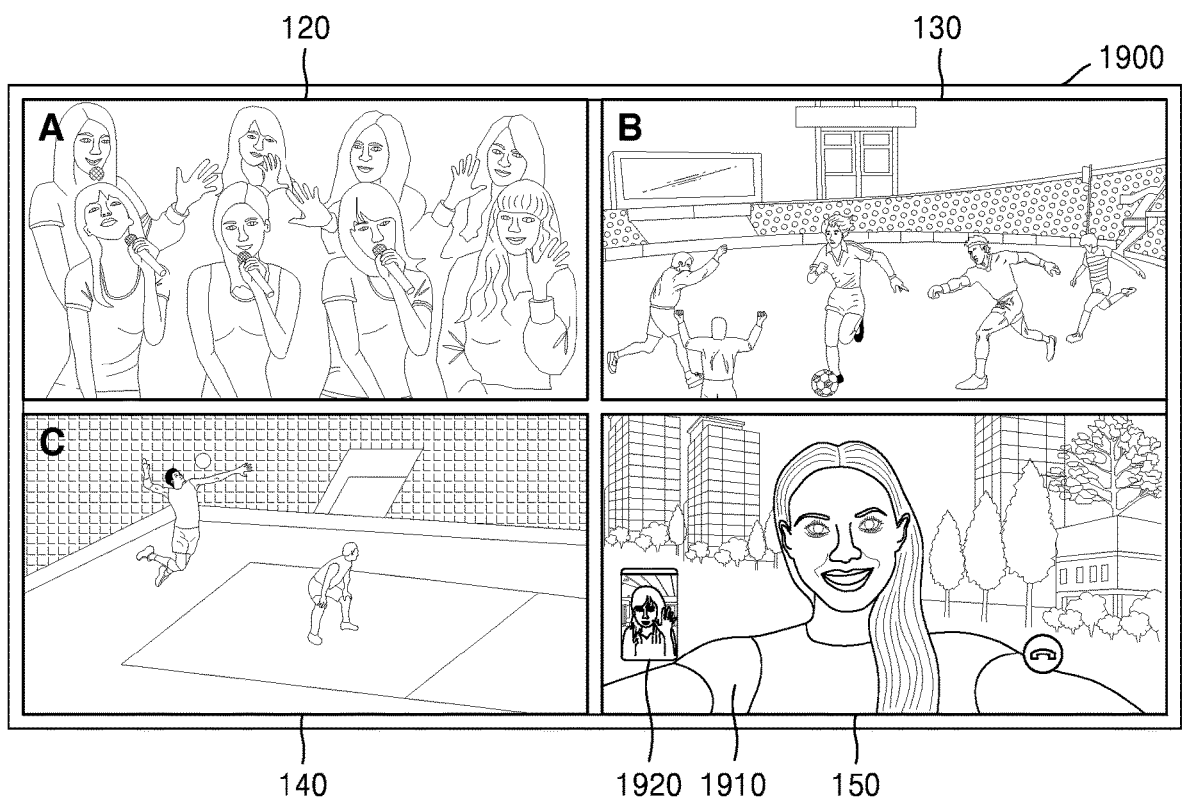
FIG. 19 is a diagram illustrating a view of an example user interface screen displayed by a display device, according to various embodiments.

FIG. 19 is a diagram illustrating a view of an example user interface screen displayed by a display device, according to various embodiments. In FIG. 19, the same elements as those in FIG. 1 are denoted by the same reference numerals. Accordingly, the same description as that made above will not be repeated.

In an embodiment of the disclosure, operation S820 may include identifying content that is a real-time broadcast or live broadcast, from among a plurality of pieces of content output through a multi-view screen, based on a video call request.

Also, operation S822 may include identifying one content that is not a real-time broadcast or live broadcast, from among a plurality of pieces of content output through a multi-view screen, based on a video call request. Here, the term 'real-time broadcast or live broadcast' may refer, for example, to a broadcast that transmits content dependent on time, and provides content that may be viewed only at a specific time. Also, the term 'non-real-time broadcast or non-live broadcast" refers, for example, to a broadcast that transmits content independent of time, and provides content that may be viewed again at any time when a user intends or may be interrupted or played regardless of time.

For example, non-real-time broadcast or non-live broadcast content may be content provided by a search engine of an Internet portal site and a server that provides content that may be purchased and viewed at any time.

That is, in operation S820 or S822, content that may be viewed again at any time when a user intends regardless of time or content that may be interrupted or played regardless of time may be identified from among the plurality of pieces of content output through the multi-view screen.

In the multi-view screen 110 of FIG. 1, third content may be video streaming content corresponding to a volleyball game, rather than a real-time broadcast or live broadcast, received from a server of a content provider, and for convenience of explanation, the third content is indicated by an icon C 141. Also, fourth content may be Internet content received from a website server that provides a portal site, and for convenience of explanation, the fourth content is indicated by an icon D 151.

Accordingly, in operation S820 or S822, the third content and the fourth content which are non-real-time or non-live content may be identified. Also, one content that is most easily interrupted and re-executed from among the third content and the fourth content may be finally identified. For example, because Internet content (e.g., a search engine) received from a website server may be easily re-executed at any time, the fourth content may be finally identified.

Accordingly, in operation S830 or S832, a video call screen may be displayed on the fourth partial screen 150 on which the identified content (the fourth content, in the above example) is output. The video call screen may include a counterpart image 1910 and a user image 1920.

Also, in an embodiment of the disclosure, in operation S820, content having a lowest resolution from among the plurality of pieces of content output through the multi-view screen may be identified, based on the video call request.

Also, in operation S822, one content having a lowest resolution from among the plurality of pieces of content output through the multi-view screen may be identified, based on the video call request.

In the multi-view screen 110 of FIG. 1A, content having a lowest content may be the fourth content. Accordingly, in operation S820 or S822, the fourth content may be identified as content having a lowest resolution. Accordingly, in operation S830 or S832, the video call screen may be displayed on the fourth partial screen 150 on which the identified content (the fourth content, in the above example) is output. That is, the display device 500 may display a multi-view screen 1900 including the video call screen.

Figure 20:
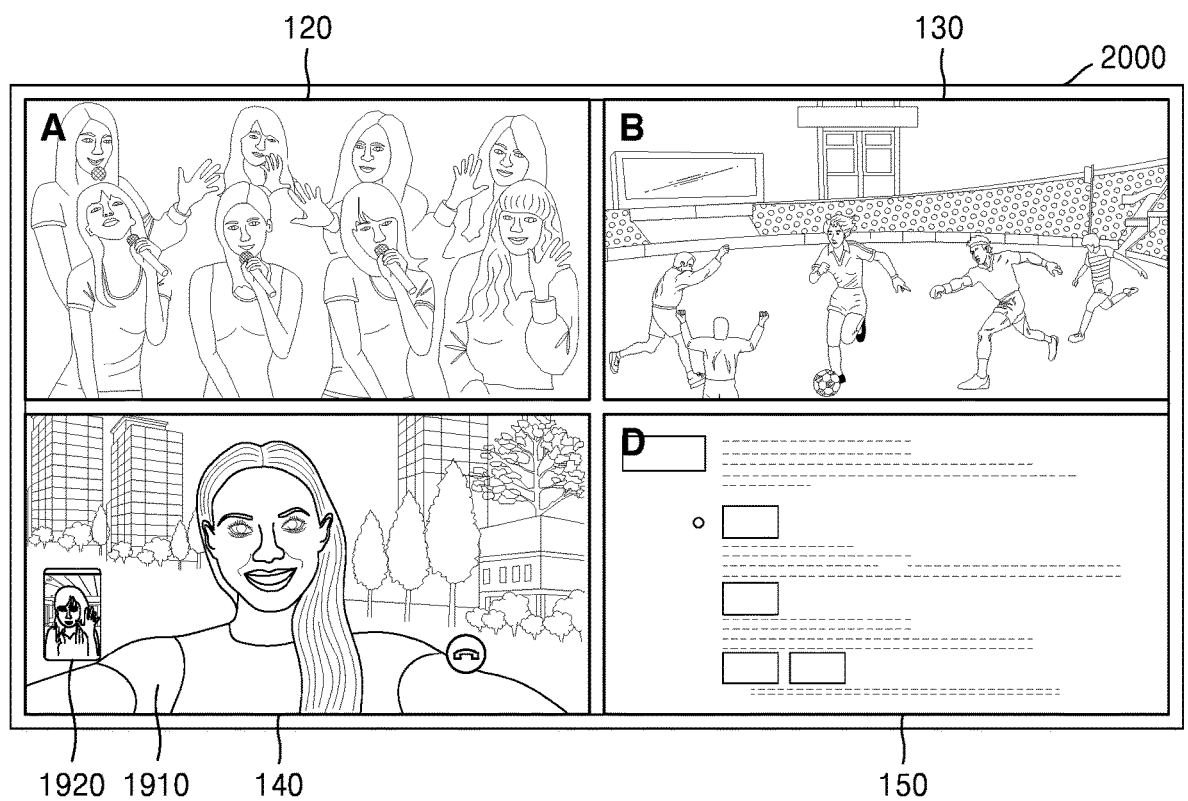
FIG. 20 is a diagram illustrating a view of an example user interface screen displayed by a display device, according to various embodiments.

FIG. 20 is a diagram illustrating a view of a user interface screen displayed by a display device, according to various embodiments. In FIG. 20, the same elements as those in FIGS. 1A and 19 are denoted by the same reference numerals. Accordingly, the same description as that made above will not be repeated.

In an embodiment of the disclosure, operation S820 may include identifying at least one content based on a user input, when a video call request is received.

Also, in operation S822, one content may be identified based on a user input, based on a video call request.

For example, when a user receives a video call request, the user may select the third partial screen 140 on which third content is output from among a plurality of partial screens. In operation S830 or S832, the third content corresponding to the partial screen selected by the user may be identified. Accordingly, in operation S830 or S832, a video call screen may be displayed on the third partial screen 140 on which the identified content (the third content, in the above example) is output. That is, the display device 500 may display a multi-view screen 2000 including the video call screen.

Figure 21:
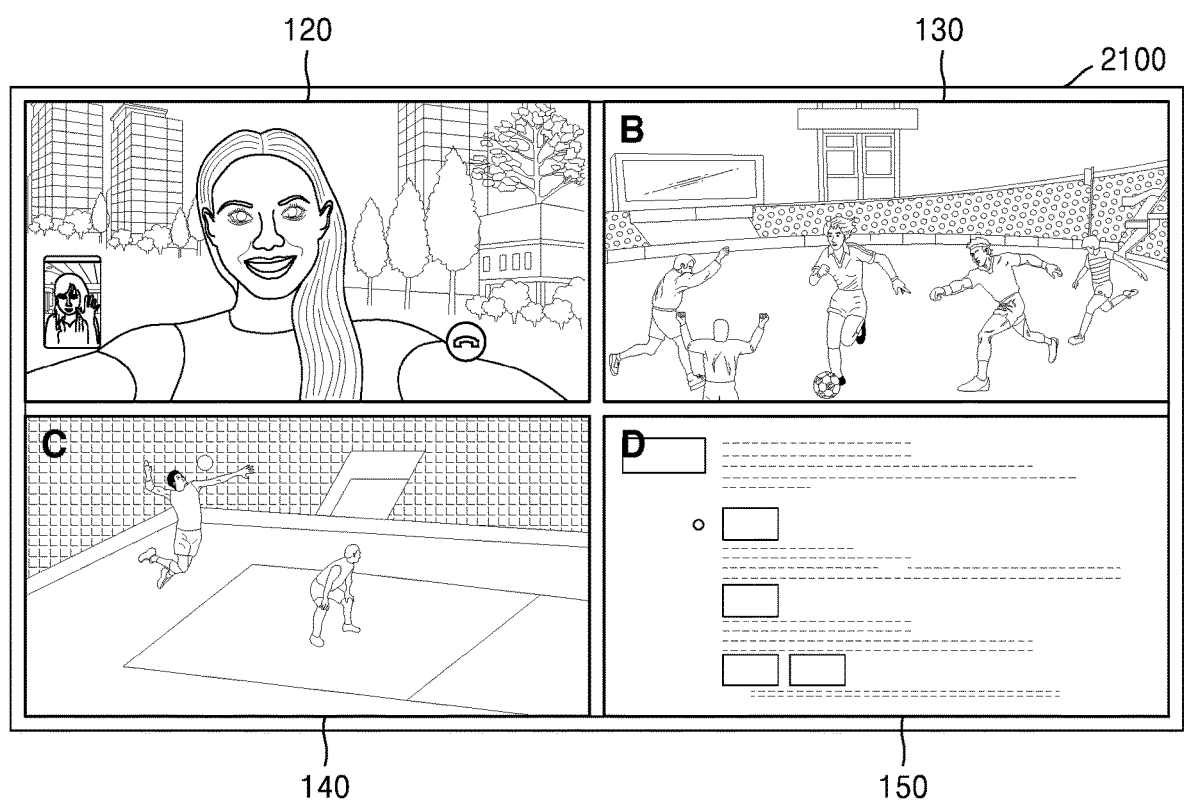
FIG. 21 is a diagram illustrating a view of an example user interface screen displayed by a display device, according to various embodiments.

FIG. 21 is a diagram illustrating a view of a user interface screen displayed by a display device, according to various embodiments. In FIG. 21, the same elements as those in FIGS. 1A and 19 are denoted by the same reference numerals. Accordingly, the same description as that made above will not be repeated.

In an embodiment of the disclosure, operation S820 may include identifying at least one content having the same resolution as a resolution of a video call screen, based on a video call request.

Also, in operation S822, one content having the same resolution as a resolution of a video call screen may be identified, based on a video call request.

For example, it is assumed that the video call request is a video call request for displaying a video call screen having a resolution of 4K. Because the first content is 4K content, a first image signal is transmitted as a 4K image signal; because the second content is 2K content, a second image signal is transmitted as a 2K image signal; because the third content is 2K content, a third image signal is transmitted as a 2K image signal; and because the fourth content is 1K content, a fourth image signal is transmitted as a 1K image signal.

In this case, in operation S820 or S822, the first content that is content having the same resolution as a resolution of 4K that is a resolution of the video call screen may be identified.

Accordingly, in operation S830 or S832, the video call screen may be displayed on the first partial screen 120 on which the identified content (the first content, in the above example) is output. That is, the display device 500 may display a multi-view screen 2100 including the video call screen.

Figure 22:
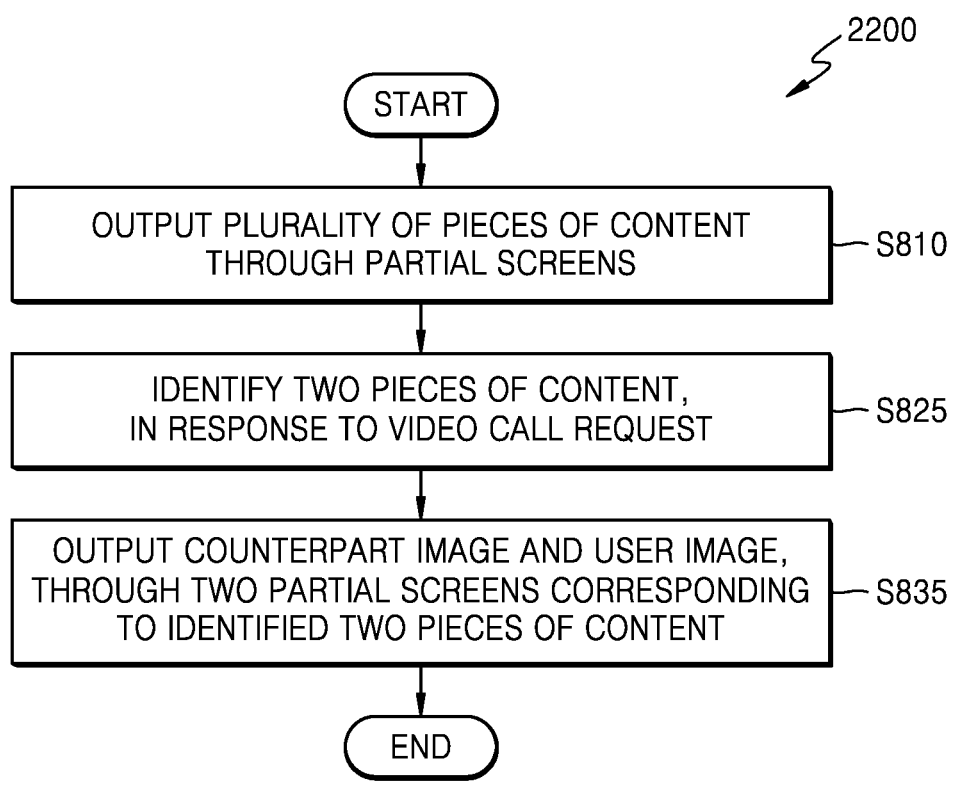
FIG. 22 is a flowchart illustrating an example operating method of a display device, according to various embodiments.

FIG. 22 is a flowchart illustrating an example operating method of a display device, according to various embodiments. When an operating method 2200 of a display device of FIG. 22 is described, the same operations as those in the operating method 800 of the display device of FIG. 8 are denoted by the same reference numerals, and also, operations S825 and S835 may respectively correspond to operations S820 and S830 of FIG. 8. Accordingly, the same description as that made above will not be repeated.

The following will be described assuming that the operating method 2200 of the display device is performed by the display device 500 of FIG. 5.

As described above, a user image signal corresponding to a user image and a counterpart image signal corresponding to a counterpart image constituting a video call screen may be transmitted. In this case, a video call request may be a video call request for displaying the counterpart image and the user image respectively corresponding to the counterpart image signal and the user image signal. Accordingly, when a video call service is provided in response to the video call request, the counterpart image and the user image need to be output through two different partial screens.

According to an embodiment of the disclosure, the counterpart image and the user image may be output through two different partial screens, which will be described in detail with reference to FIGS. 22 to 24.

Referring to FIG. 22, an operating method 2200 of a display device (e.g., 500) may include identifying two pieces of content from among a plurality of pieces of content output to a plurality of partial screens included in a multi-view screen, based on a video call request received after operation S810 (S825).

A counterpart image and a user image may be respectively displayed through two partial screens corresponding to the two pieces of content identified in operation S825 (S835).

One of the two pieces of content identified in operation S825 may be content having the same resolution as a resolution of a counterpart image signal, and the other may be content having the same resolution as a resolution of a user image signal.

Alternatively, the two pieces of content identified in operation S825 may be two pieces of content having a lowest resolution from among the plurality of pieces of content output through the multi-view screen. Alternatively, the two pieces of content identified in operation S825 may be two pieces of content selected by a user from among the plurality of pieces of content output through the multi-view screen.

Alternatively, the two pieces of content identified in operation S825 may be two pieces of content selected in order of having a lowest resolution from among from among the plurality of pieces of content output through the multi-view screen.

Alternatively, the two pieces of content identified in operation S825 may be two pieces of content having an offset resolution from among the plurality of pieces of content output through the multi-view screen.

Alternatively, the two pieces of content identified in operation S825 may be two pieces of content output through a main screen and a sub-screen from among the plurality of pieces of content output through the multi-view screen.

Alternatively, the two pieces of content identified in operation S825 may be two pieces of content output through two preset partial screens from among the plurality of pieces of content output through the multi-view screen.

Alternatively, the two pieces of content identified in operation S825 may be two pieces of content, which are played last, from among the plurality of pieces of content output through the multi-view screen.

Alternatively, the two pieces of content identified in operation S825 may be two pieces of content that are correlated to each other from among the plurality of pieces of content output through the multi-view screen. The 'pieces of content that are correlated to each other' may refer, for example, to two or more pieces of content that output related images from among the plurality of pieces of content output through the multi-view screen.

For example, the 'pieces of content that are correlated to each other' may, for example, be pieces of content corresponding to a plurality of scenes in sports game content such as baseball. In detail, when one content is content mainly showing a batter in a baseball game, another content related to the one content may be content mainly showing a catcher, content mainly showing a manager, and/or content mainly showing spectators in the specific baseball game. In another example, in the case of content relaying a specific performance, a plurality of pieces of content showing a plurality of performers acting or performing in the performance may be pieces of content that are correlated to each other. In a specific classical performance, content relaying a violinist, content relaying a cellist, content relaying a conductor, and/or content relaying a pianist may be pieces of content that are correlated to each other.

For example, a multi-view screen may include four partial screens, and two pieces of content output through two partial screens from among the four partial screens may be pieces of content that are correlated to each other. In this case, the two pieces of content identified in operation S825 may be two pieces of content that are correlated to each other.

When there are three or more pieces of content that are correlated to each other from among the plurality of pieces of content included in the multi-view screen, in operation S825, two may be selected from among the three or more pieces of content that are correlated to each other. For example, the processor 410 may select two pieces of content in order of being received last from among the plurality of pieces of content that are correlated to each other. Alternatively, the processor 410 may select two pieces of content in order of having a lowest resolution from among the pieces of content that are correlated to each other. Alternatively, the processor 410 may select two pieces of content in order of having a highest resolution from among the plurality of pieces of content that are correlated to each other. Alternatively, the processor 410 may select two pieces of content having resolutions corresponding to a resolution of an image signal of the counterpart image and a resolution of an image signal of the user image from among the plurality of pieces of content that are correlated to each other.

For example, when the user image signal and the counterpart image signal for constituting the video call screen respectively have an ultra-high-definition (UHD) resolution and a full high-definition (FHD) resolution, a multi-view application included in the processor 410 may identify two pieces of content having an UHD resolution and an FHD resolution from among the plurality of pieces of content output through the multi-view screen. The multi-view application may control decoding of the identified two pieces of content to be stopped and the user image signal and the counterpart image signal to be decoded by using decoders that have stopped decoding.

Figure 23:
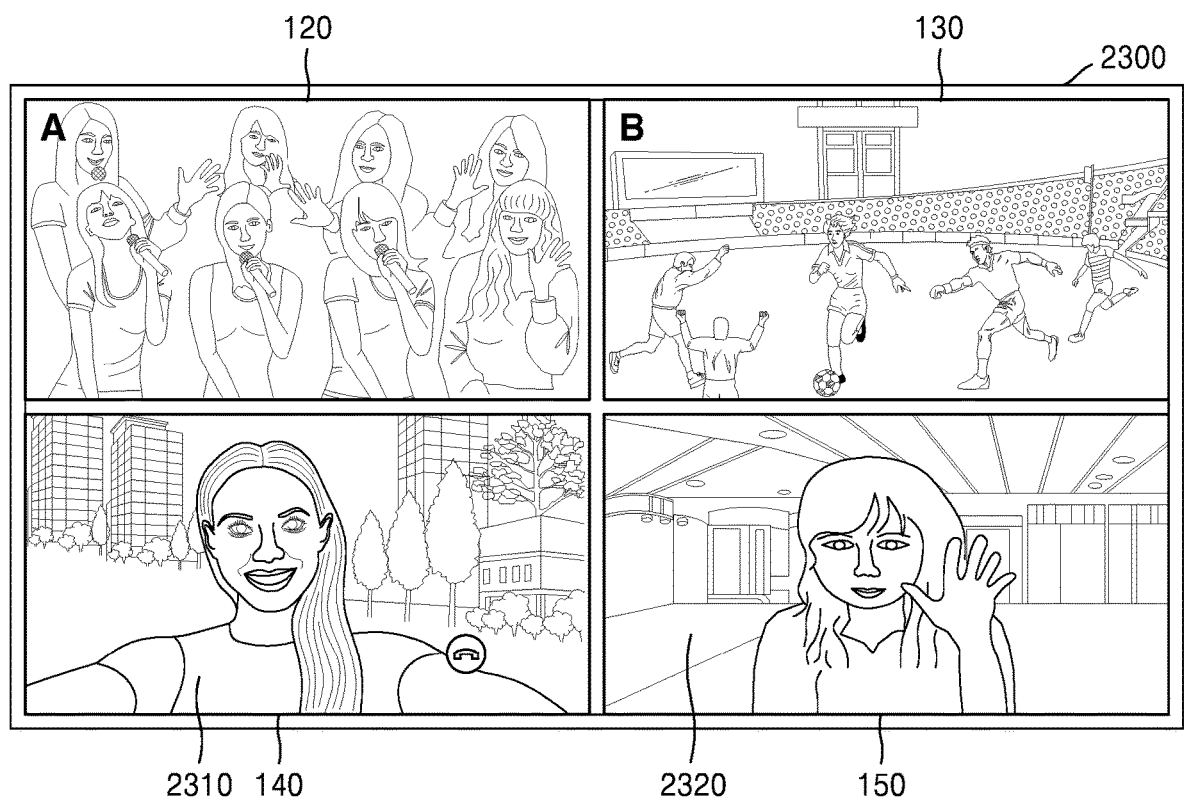
FIG. 23 is a diagram illustrating a view of an example user interface screen displayed by a display device, according to various embodiments.

FIG. 23 is a diagram illustrating a view of an example user interface screen displayed by a display device, according to various embodiments. In FIG. 23, the same elements as those in FIG. 1A are denoted by the same reference numerals. Accordingly, the same description as that made above will not be repeated.

Referring to FIGS. 22 and 23, the operating method 2200 of a display device (e.g., 500) may include identifying two pieces of content from among a plurality of pieces of content output to a plurality of partial screens included in a multi-view screen 2300, based on a video call request received after operation S810 (S825).

A counterpart image and a user image may be displayed through two partial screens corresponding to the two pieces of content identified in operation S825 (S835).

For example, one of the two pieces of content identified in operation S825 may be content having the same resolution as that of a counterpart image signal, and the other may be content having the same resolution as that of a user image signal. For example, because the third content is 2K content, a third image signal is transmitted as a 2K image signal, and because the fourth content is 1K content, a fourth image signal is transmitted as a 1K image signal. It is assumed that the counterpart image signal is an image signal having a resolution of 2K, and the user image signal is an image signal having a resolution of 1K. In this case, in operation S825, the third content and the fourth content having resolutions corresponding to those of the counterpart image signal and the user image signal may be identified.

Accordingly, in operation S835, a counterpart image 2310 may be displayed through a third partial screen on which the identified third content is output, and a user image 2320 may be displayed through a fourth partial screen on which the identified fourth content is output.

Figure 24:
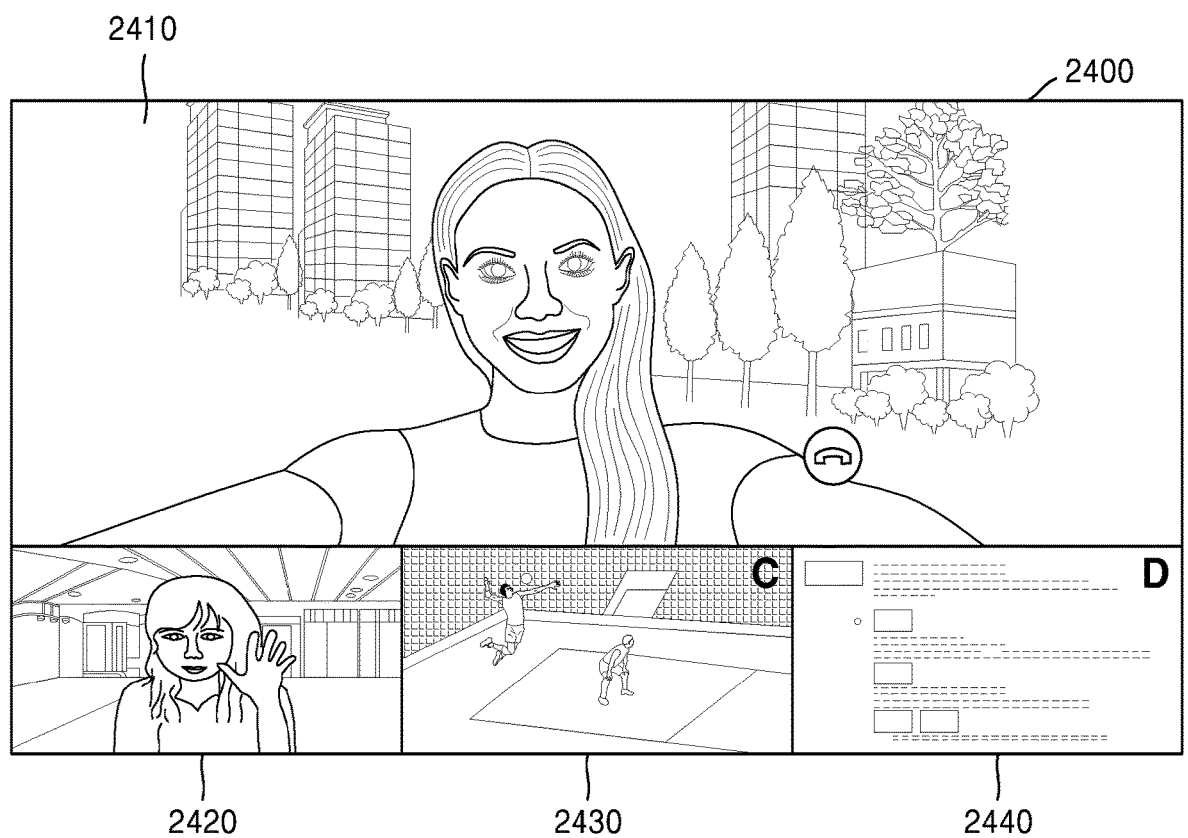
FIG. 24 is a diagram illustrating a view of an example user interface screen displayed by a display device, according to various embodiments.

FIG. 24 is a diagram illustrating a view of an example user interface screen displayed by a display device, according to various embodiments.

Referring to FIG. 24, a multi-view screen 2400 including four partial screens may include a main screen 2410 and one or more sub-screens 2420, 2430, and 2440.

In the above example, two pieces of content identified in operation S825 may be two pieces of content output through a main screen and a sub-screen from among a plurality of pieces of content output through a multi-view screen. For example, content output through the main screen 2410 and content output through any one of the sub-screens 2420, 2430, and 2440 may be identified. Also, when there are a plurality of sub-screens, content output through an uppermost sub-screen or a leftmost partial screen may be identified.

A user provided with a video call service may generally want to see an image of a counterpart in a large size and may want to see an image of the user in a small size. Accordingly, the two pieces of content identified in operation S825 may be two pieces of content output through a main screen and a sub-screen from among a plurality of pieces of content output through a multi-view screen. The image of the counterpart may be displayed through the main screen, and the image of the user may be displayed through the sub-screen.

Referring to FIG. 24, a counterpart image and a user image may be respectively displayed on the main screen 2410 and the sub-screen (e.g., 2420) on which the two pieces of content identified in operation S825 have been output. Accordingly, the multi-view screen 2400 that displays the counterpart image on the main screen 2410 and the user image on the sub-screen (e.g., 2420) may be output.

Figure 25:
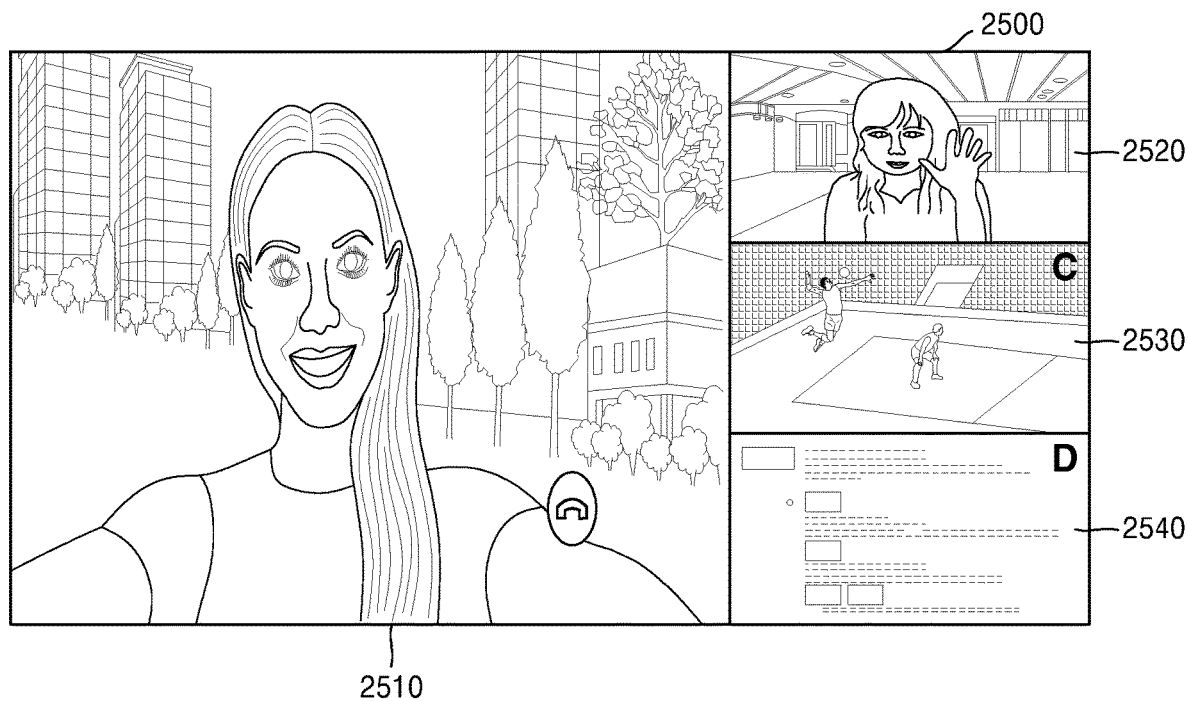
FIG. 25 is a diagram illustrating a view of an example user interface screen displayed by a display device, according to various embodiments.

FIG. 25 is a diagram illustrating a view of an example user interface screen displayed by a display device, according to various embodiments. Referring to FIG. 25, a multi-view screen 2500 including four partial screens may include a main screen 2510 and one or more sub-screens 2520, 2530, and 2540.

Referring to FIG. 25, a counterpart image and a user image may be displayed on the main screen 2510 and the sub-screen (e.g., 2520) on which two pieces of content identified in operation S825 have been output. Accordingly, the multi-view screen 2500 that displays the counterpart image on the main screen 2510 and the user image on the sub-screen (e.g., 2520) may be output.

As described above, in an embodiment of the disclosure, a display device that receives a video call request while outputting a multi-view screen may provide a video call service while continuously outputting the multi-view screen, to increase user satisfaction. Accordingly, user satisfaction and user convenience may be increased.

An operating method of a display device according to an embodiment of the disclosure may be implemented as a program command executable by various computer components and may be recorded on a computer-readable medium. Also, an embodiment of the disclosure may be implemented in a computer-readable recording medium having recorded thereon at least one program including instructions for executing an operating method of a display device.

The computer-readable medium may include program commands, data files, data structures, and the like separately or in combinations. The program commands recorded on the computer-readable medium may be specially designed and configured for the disclosure or may be well-known to and be usable by one of ordinary skill in the art of computer software. Examples of the computer-readable recording medium include a magnetic medium such as a hard disk, a floppy disk, or a magnetic tape, an optical medium such as a compact disc read-only memory (CD-ROM) or a digital versatile disc (DVD), a magneto-optical medium such as a floptical disk, and a hardware device specially configured to store and execute program commands such as a ROM, a RAM, or a flash memory. Examples of the program commands include advanced language code that may be executed by a computer by using an interpreter or the like as well as machine language code made by a compiler.

A machine-readable storage medium may be provided in a form of a non-transitory storage medium. Here, the term 'non-transitory storage medium' refers to a tangible device and does not include a signal (for example, electromagnetic waves). This term does not distinguish whether data is stored semi-permanently or temporarily in the storage medium. For example, the 'non-transitory storage medium' may include a buffer in which data is temporarily stored.

According to an embodiment of the disclosure, operating methods of display devices according to various embodiments of the disclosure may be provided in a computer program product. The computer program product is a product purchasable between a seller and a purchaser. The computer program product may be distributed in the form of a machine-readable storage medium (e.g., a compact disc read-only memory (CD-ROM)), or may be distributed (e.g., downloaded or uploaded) online via an application store (e.g., Play Store™) or between two user devices (e.g., smartphones) directly. When distributed online, at least part of the computer program product (e.g., a downloadable application) may be temporarily generated or at least temporarily stored in a machine-readable storage medium, such as a memory of a server of a manufacturer, a server of an application store, or a relay server.

An embodiment of the disclosure may be implemented as a computer program product including a recording medium having recorded thereon a program for executing an operating method of a display device.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An operating method of a display device comprising a plurality of decoders for displaying a multi-view screen comprising a plurality of partial screens, the operating method comprising:

respectively outputting a plurality of pieces of content, which are individually decoded using the plurality of decoders, through the plurality of partial screens;

receiving a video call request while the plurality of pieces of content is output through the plurality of screens; and in response to a lack of resources for processing an image signal corresponding to the video call request:

identifying at least one content from among the plurality of pieces of content to secure a resource required for decoding the image signal corresponding to the video call request;
stopping, by at least one decoder included in the display device, decoding of the identified at least one content;
securing the at least one decoder that has stopped decoding, as the resource required for decoding the image signal corresponding to the video call request;
decoding, by the secured at least one decoder, the image signal corresponding to a video call screen; and
outputting the video call screen for the received video call request through at least one partial screen, corresponding to the identified at least one content, from among the plurality of partial screens.

2. The operating method of claim 1, wherein the identifying of the at least one content comprises identifying content having a same resolution as a resolution of the video call screen, from among the plurality of pieces of content.

3. The operating method of claim 1, wherein the identifying of the at least one content comprises identifying content having an offset resolution, from among the plurality of pieces of content.

4. The operating method of claim 1, wherein the identifying of the at least one content comprises identifying content having a lowest resolution, from among the plurality of pieces of content.

5. The operating method of claim 1, wherein the identifying of the at least one content comprises identifying content output through a main screen, from among the plurality of pieces of content.

6. The operating method of claim 1, wherein the at least one content is identified based on having a resolution corresponding to the video call screen, and the operating method further comprises:
based on identifying no content as having the resolution corresponding to the video call screen, performing a voice call switching process.

7. The operating method of claim 1, wherein the at least one content is identified based on having a resolution corresponding to the video call screen, and the operating method further comprises:
based on identifying no content as having the resolution corresponding to the video call screen, ending a video call process.

8. The operating method of claim 1, further comprising:
in response to receiving the video call request, displaying a user interface screen for selecting at least one of the plurality of partial screens; and
receiving a user input for selecting at least one of the plurality of partial screens through the user interface screen,
wherein the identified at least one content comprises content corresponding to the selected at least one partial screen.

9. The operating method of claim 1, wherein the identified at least one content comprises first content from among the plurality of pieces of content output through the multi-view screen, and
the outputting of the video call screen comprises outputting the video call screen through a first partial screen corresponding to the first content.

10. The operating method of claim 9, wherein the outputting of the video call screen comprises:
stopping outputting of the first content through the first partial screen by stopping decoding of a first image signal corresponding to the first content;
decoding, by a decoder that has stopped decoding the first image signal, the image signal; and
outputting the video call screen through the first partial screen based on the decoded image signal.

11. The operating method of claim 1, wherein the identified at least one content comprises first content and second content from among the plurality of pieces of content output through the multi-view screen, and
the outputting of the video call screen comprises respectively displaying a counterpart image and a user image included in the video call screen on a first partial screen corresponding to the first content and a second partial screen corresponding to the second content.

12. The operating method of claim 11, wherein the outputting of the video call screen further comprises:
stopping outputting of the first content and the second content through the first partial screen and the second partial screen by stopping decoding of a first image signal and a second image signal respectively corresponding to the first content and the second content;
decoding, by decoders that have stopped decoding the first image signal and the second image signal, a counterpart image signal and a user image signal respectively corresponding to the counterpart image and the user image; and
respectively outputting the counterpart image and the user image to the first partial screen and the second partial screen, based on the decoded counterpart image signal and user image signal.

13. The operating method of claim 11, wherein
the first partial screen is a main screen from among the plurality of partial screens, and
the second partial screen is a sub-screen from among the plurality of partial screens.

14. A display device comprising:
a display;
a communication interface including communication circuitry;
a video processor comprising a plurality of decoders; and
at least one processor, comprising processing circuitry, configured to execute at least one instruction and to control the display device to:
control the display to respectively output a plurality of pieces of content, which are individually decoded by the plurality of decoders comprised in the video processor, through a plurality of partial screens included in a multi-view screen;
receive a video call request while the plurality of pieces of content is output through the plurality of screens;
in response to a lack of resources for processing an image signal corresponding to the video call request:
identify at least one content from among the plurality of pieces of content to secure a resource required for decoding the image signal corresponding to the video call request;
stop, by at least one decoder included in the display device, decoding of the identified at least one content;
secure the at least one decoder that has stopped decoding, as the resource required for decoding the image signal corresponding to the video call request;
decode, by the secured at least one decoder, the image signal corresponding to a video call screen; and
control the display to output the video screen for the received video call request through at least one partial screen corresponding to the identified at least one content from among the plurality of partial screens.

15. One or more non-transitory computer-readable storage media storing computer-executable instructions including at least one instruction to cause a display device comprising a plurality of decoders to:
- control a display to respectively output a plurality of pieces of content, which are individually decoded using the plurality of decoders through a plurality of partial screens;
- receive a video call request while the plurality of pieces of content is output through the plurality of screens; and
- in response to a lack of resources for processing an image signal corresponding to the video call request:
  - identify at least one content from among the plurality of pieces of content to secure a resource required for decoding the image signal corresponding to the video call request;
  - stop, by at least one decoder included in the display device, decoding of the identified at least one content;
  - secure the at least one decoder that has stopped decoding, as the resource required for decoding the image signal corresponding to the video call request;
  - decode, by the secured at least one decoder, the image signal corresponding to a video call screen; and
  - output the video call screen for the received video call request through at least one partial screen, corresponding to the identified at least one content, from among the plurality of partial screens.

* * * * *